(12) United States Patent
Abbotoy et al.

(10) Patent No.: US 7,219,036 B2
(45) Date of Patent: May 15, 2007

(54) METHOD FOR BALANCING AN ARTICLE FOR ROTATION

(75) Inventors: Mark E. Abbotoy, Hartsville, TN (US); Vincent J. Morgillo, Northwood, OH (US)

(73) Assignee: Torque-Traction Technologies LLC, Maumee, OH (US)

( * ) Notice: Subject to any disclaimer, the term of this patent is extended or adjusted under 35 U.S.C. 154(b) by 0 days.

(21) Appl. No.: 11/365,956

(22) Filed: Feb. 28, 2006

(65) Prior Publication Data

US 2006/0173652 A1 Aug. 3, 2006

Related U.S. Application Data

(63) Continuation of application No. PCT/US04/028146, filed on Aug. 28, 2004.

(60) Provisional application No. 60/498,667, filed on Aug. 28, 2003.

(51) Int. Cl.
*G01M 1/00* (2006.01)

(52) U.S. Cl. .................. 702/183; 702/145; 702/85; 702/179; 702/163; 73/66; 73/458; 73/468

(58) Field of Classification Search ................ 702/183, 702/145, 148, 155, 158, 163, 179, 105, 85; 73/8, 146, 460, 462, 66, 458, 468
See application file for complete search history.

(56) References Cited

U.S. PATENT DOCUMENTS

| 4,144,578 | A | 3/1979 | Mueller et al. |
| 5,033,003 | A | 7/1991 | Lees, Sr. |
| 6,324,908 | B1 * | 12/2001 | Colarelli et al. ............... 73/462 |
| 6,389,895 | B2 * | 5/2002 | Colarelli et al. ............... 73/462 |
| 6,393,911 | B2 * | 5/2002 | Colarelli et al. ............... 73/462 |

FOREIGN PATENT DOCUMENTS

WO    WO 91/04476    4/1991

OTHER PUBLICATIONS

Fundamentals Of Balancing, pp. 1-122, Apr. 1990.
Measurement Systems Analysis Reference Manual, pp. 1-120, Feb. 1995.

* cited by examiner

*Primary Examiner*—Michael Nghiem
*Assistant Examiner*—Hien Vo
(74) *Attorney, Agent, or Firm*—MacMillan, Sobanski & Todd, LLC

(57) ABSTRACT

A method for statistically analyzing the operation of a machine for balancing articles for rotation so as to reduce measurement errors and thereby enhance productivity and quality including the steps of collecting raw data during production balancing of articles for rotation, and statistically analyzing the data to determine appropriate process control limits for prompting investigative or corrective action if a process control limit is exceeded.

14 Claims, 17 Drawing Sheets

|  | Plotted in FIG 16 | | Plotted in FIG 17 | |
|---|---|---|---|---|
| Data Point Number | X | y | $X_T$ | $Y_T$ |
| 1 | 1 | 0 | -7.66 | -0.09 |
| 2 | 1 | 1 | -6.91 | 0.57 |
| 3 | 3 | 1 | -5.58 | -0.93 |
| 4 | 3 | 2 | -4.83 | -0.26 |
| 5 | 3 | 3 | -4.08 | 0.40 |
| 6 | 3 | 4 | -3.33 | 1.06 |
| 7 | 5 | 2 | -3.51 | -1.76 |
| 8 | 5 | 4 | -2.01 | -0.44 |
| 9 | 5 | 5 | -1.26 | 0.22 |
| 10 | 5 | 6 | -0.51 | 0.88 |
| 11 | 7 | 5 | 0.06 | -1.28 |
| 12 | 7 | 6 | 0.81 | -0.62 |
| 13 | 7 | 7 | 1.56 | 0.04 |
| 14 | 7 | 9 | 3.06 | 1.37 |
| 15 | 9 | 8 | 3.63 | -0.79 |
| 16 | 9 | 9 | 4.38 | -0.13 |
| 17 | 9 | 10 | 5.13 | 0.53 |
| 18 | 9 | 11 | 5.88 | 1.19 |
| 19 | 11 | 11 | 7.21 | -0.31 |
| 20 | 11 | 12 | 7.96 | 0.35 |
| Avg.= | 6 | 5.8 | | |
| Sum of Squares | | | 428.07 | 13.13 |

R-Sq.= 0.89  Fcalc= 0.03
R= 0.94
Slope (m) = 1.13
Angle(rad.)= 0.848
Angle(deg.)= 48.58
(Phi)

Fcrit HI = 3.56
Fcrit LO = 0.28

IF Fcalc > 3.56 the data is NOT Circular and should blink.
IF Fcalc < 0.28 the data is NOT Circular and should blink.

FIG. 15

METHOD FOR BALANCING AN ARTICLE FOR ROTATION

CROSS-REFERENCE TO RELATED APPLICATIONS

This application is a continuation of International Application No. PCT/US04/028146, filed Aug. 28, 2004, which claims priority from U.S. Provisional Application No. 60/498,667, filed Aug. 28, 2003. The disclosures of both of these applications are incorporated herein by reference.

BACKGROUND OF THE INVENTION

This invention relates in general to method for balancing articles for rotation. In particular, this invention relates to an improved method for statistically analyzing the operation of a machine for balancing articles for rotation so as to reduce measurement errors and thereby enhance productivity and quality.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft to an input shaft of an axle assembly so as to rotatably drive the wheels of the vehicle. To accomplish this, a typical driveshaft includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

Ideally, the driveshaft tube would be formed in the shape of a cylinder that is absolutely round, absolutely straight, and has an absolutely uniform wall thickness. Such a perfectly shaped driveshaft tube would be precisely balanced for rotation and, therefore, would not generate any undesirable noise or vibration during use. In actual practice, however, the driveshaft tube and other components of the driveshaft usually contain variations in roundness, straightness, and wall thickness that result in minor imbalances when rotated at high speeds. To prevent such imbalances from generating undesirable noise or vibration when rotated during use, therefore, it is commonplace to counteract such imbalances by performing a corrective action, such as by such as by securing one or more balance weights to the driveshaft or by removing material therefrom, for example. The corrective action is taken to counterbalance the imbalances of the driveshaft such that it is balanced for rotation during use.

Traditionally, the balancing process has been performed with the use of a conventional balancing machine. Referring to FIG. 1, a typical balancing machine, indicated generally at 10, includes a pair of fittings 12 that are adapted to support the ends of a driveshaft 14 thereon. The balancing apparatus 10 further includes a motor (not shown) for rotating the driveshaft 14 at a predetermined speed. As the driveshaft 14 is rotated, the balancing machine 10 senses vibrations that are caused by imbalances in the structure of the driveshaft 14. The balancing machine 10 is responsive to such vibrations for determining (1) if the driveshaft 14 is out of balance and, if so, (2) the magnitude and location of a corrective action that can be taken to counterbalance the imbalances of the driveshaft 14 such that it is balanced for rotation during use. The addition of a balancing weight 16 at the identified location and having a mass of the identified magnitude is an example of such a corrective action. The rotation of the driveshaft 14 is then stopped to allow such corrective action to be taken. Then, the driveshaft 14 is again rotated to confirm whether proper balance has been achieved or to determine if additional corrective action required. A number of such balancing machines of this general structure and method of operation are known in the art.

Ideally, each driveshaft 14 would be supported on the balancing machine 10 and rotated and measured only once to confirm that it was manufactured in such a manner as to be properly balanced. As a practical matter, however, driveshaft assemblies are not manufacture so precisely. Thus, each driveshaft 14 is usually supported on the balancing machine 10 and rotated and measured at least twice, a first time to measure the magnitude and location of the imbalance therein, and a second time to confirm that proper balance has been achieved after the corrective action has been taken.

Although known balancing machines of this general type have been effective, this balancing process is further complicated by the fact that conventional balancing machines are subject to measurement errors that result merely from the use thereof. Such measurement errors can be generally attributed to being the result of either (1) the imprecise positioning of the driveshaft assemblies on the balancing machine, (2) the internal operation of the balancing machine itself, and/or (3) part variation (e.g., looseness of the components within a part can cause inconsistent measurements of imbalance). Because of the measurement errors that are generated as a result of the balancing machine discussed above, it is common for each driveshaft to be rotated and measured more than two times in order to achieve an adequate level of confidence that the proper balance has been achieved. This time consuming and repetitious process is particularly problematic in the context of balancing vehicular driveshaft assemblies, which are typically manufactured in relatively large volumes.

A variety of attempts have been made to account for these measurement errors and thereby improve productivity and quality in the balancing process. However, known attempts to account for these measurement errors have met with limited success.

One aspect of these attempts is to monitor production gage R & R (Repeatability and Reliability), that is, to monitor how well the balance machines, together with the fixtures for mounting the driveshafts on the balance machines produce repeatable and reliable results. In the past, long term gage R & R studies involved the repeated measurement of one or more known driveshaft test samples. During this long term study, the balancing machine would obviously be unavailable for use in measuring production throughput, impacting productivity. It would be desirable to provide an improved method for statistically analyzing the operation of a machine for balancing articles for rotation so as to reduce measurement errors and thereby enhance productivity and quality.

SUMMARY OF THE INVENTION

This invention relates in general to a method for balancing articles for rotation. In particular, this invention relates to a improved method for statistically analyzing the operation of a machine for balancing articles for rotation so as to reduce measurement errors and thereby enhance productivity and quality. The invention includes the use of statistical process control algorithms to develop and analyze imbalance measurement data taken on various driveshafts or other manufactured components measured on balance machines to identify normal and abnormal variations in measurements of such driveshafts, and suggest the corrective action to be taken for abnormal variations. In a first aspect of this invention, the algorithm provides a method for determining process control limits so as to separate midpoints that are out of statistical control from midpoints that are within statistical control. In a second aspect of this invention, the algorithm provides a method for evaluating the amount of initial imbalance that is present in a plurality of driveshaft assemblies or other articles so as to provide process control information to the manufacturer of such incoming driveshaft assemblies. In a third aspect of this invention, the algorithm provides a method for performing measurement error analysis so as to measure the amount of total error observed in the balancing measurement system (including contributions from the parts, fixtures, balancer, balance measurement electronics, and the operator). An advantage of the method according to this invention is that historical midpoint data, collected during production as the production driveshafts are measured for balance, is utilized to calculate gage R & R, instead of the previously required method of removing a balancer from use as a production machine to subject it to time-consuming, and productivity reducing, studies involving repeated balancing of special test driveshafts is utilized to calculate gage R & R. In a fourth embodiment of this invention, the algorithm provides a method for analyzing patterns that are created by the distribution of the midpoints on the polar coordinate graph so as to provide an understanding of the data, such as, for example, to permit the identification of prime contributors to the imbalance so that corrective actions can be determined and performed.

Various objects and advantages of this invention will become apparent to those skilled in the art from the following detailed description of the preferred embodiment, when read in light of the accompanying drawings.

BRIEF DESCRIPTION OF THE DRAWINGS

FIG. 15 is a table of exemplary data to be analyzed.

DETAILED DESCRIPTION OF THE PREFERRED EMBODIMENT

Preliminarily it should be noted that balance is a zero quantity, and therefore is detected by observing an absence of imbalance. Balancing machines therefore technically measure only imbalance, never balance. However, phraseology such as "measuring balance" and "balance measurement" are frequently used, and such is well understood to mean, respectively, "measuring imbalance" and "imbalance measurement". As used herein, the phrase "measuring balance" and like phrases should be interpreted to mean the same thing as "measuring imbalance". Also note that "unbalance" and "imbalance" are synonymous, and may be interchangeably used herein.

Referring to the Figures, there is disclosed an improved method for statistically analyzing the operation of a machine for balancing articles for rotation so as to reduce measurement errors and thereby enhance productivity and quality.

The method illustrated herein as an example presupposes that the method of the invention will be applied at, for example, a factory producing vehicle driveshafts, that multiple balance machines are utilized to analyze the driveshafts produced by the factory, that multiple operators run the balance machines over multiple shifts over multiple days, for a significant period of time, and that various models of driveshafts, with different structures, may be manufactured and measured for imbalance. Each of these factors can contribute to the variability in imbalance measurement data collected from the driveshafts produced by the factory, separate from the actual variability in imbalance of the driveshafts produced by the plant. Of course, the method presented herein can be applied to a variety of goods other than vehicle driveshafts, including without limitation such components as motor armatures, pump rotors, jet turbine rotors, crankshafts, wheels, drive and propeller shafts for other than vehicles, printing or paper machinery rolls, fans, gears, gyroscope rotors, etc. Furthermore, while certain sample sizes and intervals are suggested herein, these of course may be varied in accordance with well-known principles of statistical analysis to achieve the desired confidence levels for a given factory through-put and a given product.

Figure 1:
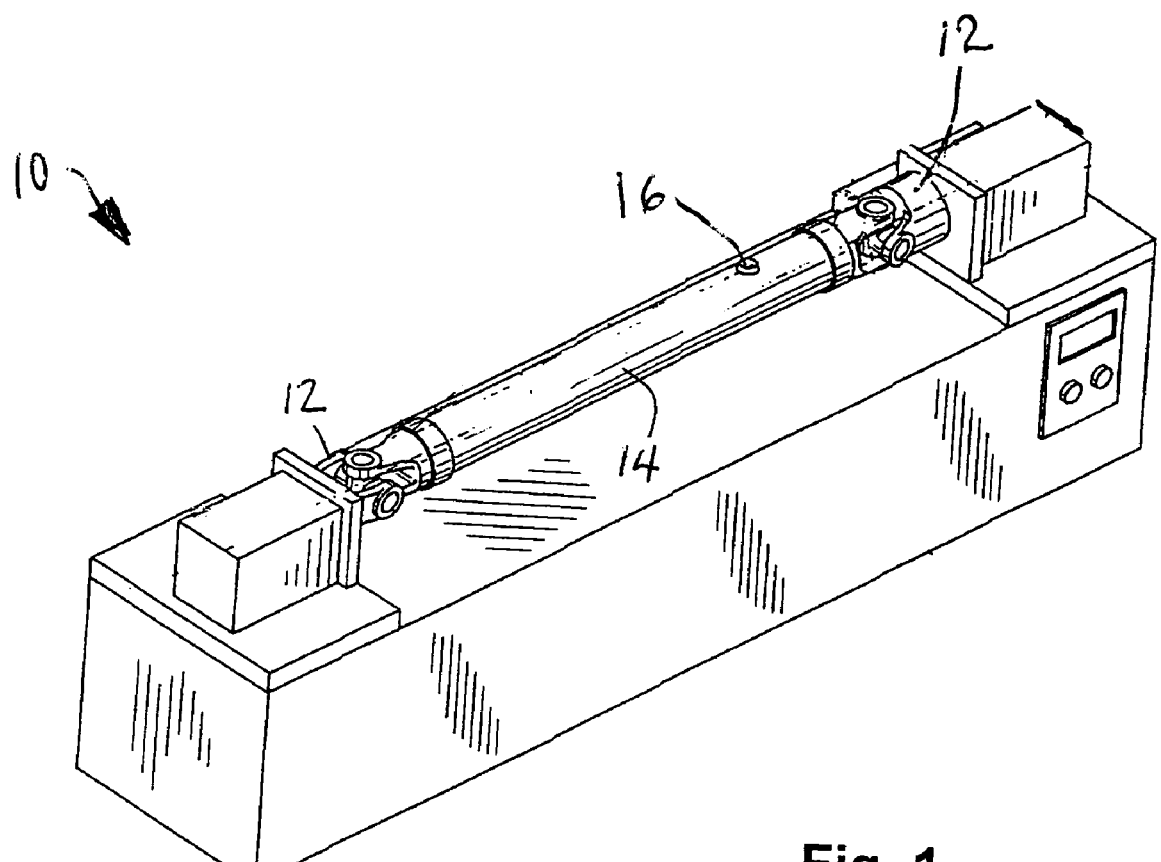
FIG. 1 is a perspective view of a typical balancing machine with a driveshaft mounted thereon for balancing.
Figure 2:
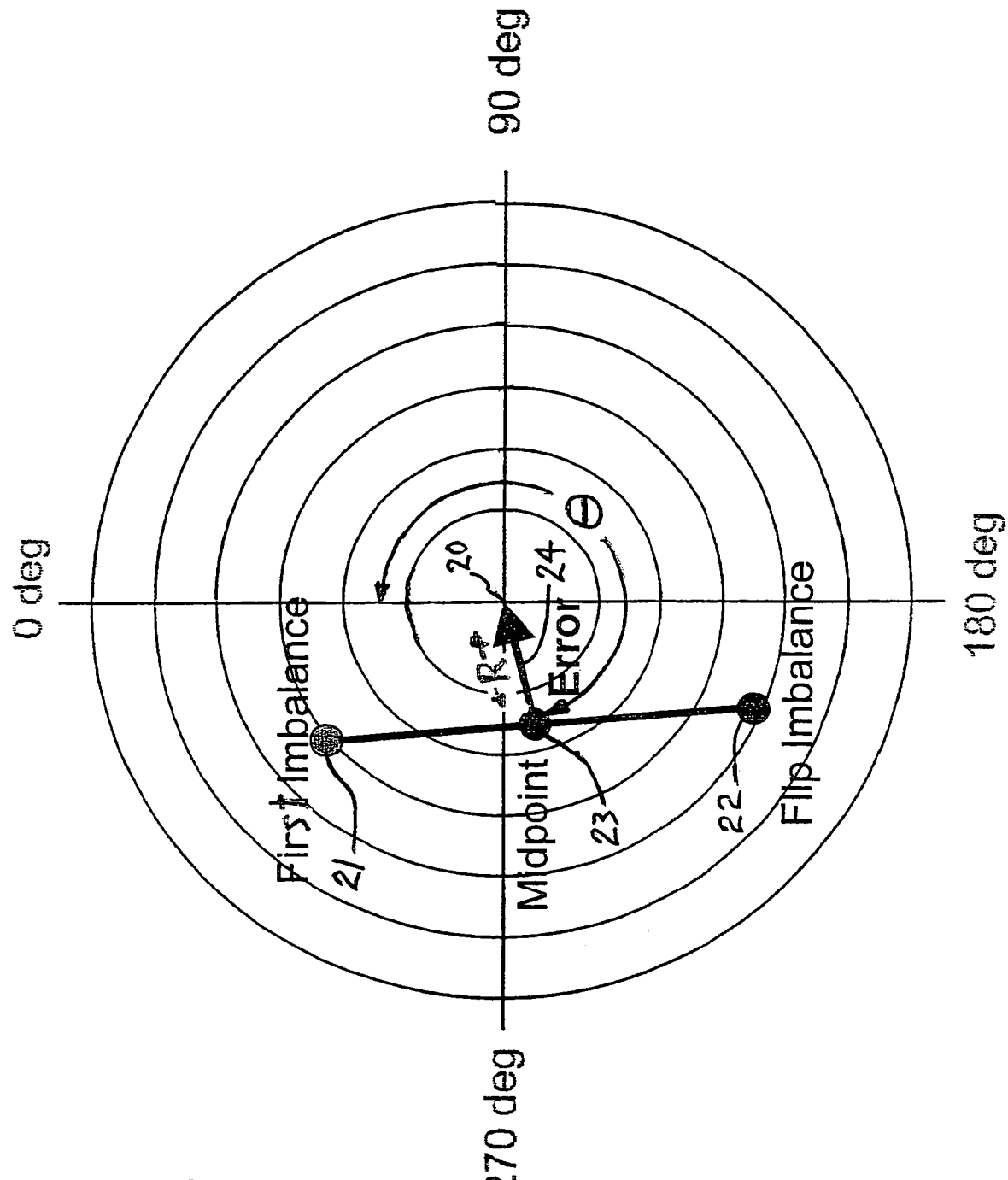
FIG. 2 is an exemplary polar coordinate graph plotting a midpoint between an imbalance reading in a zero degree first position and an imbalance reading taken with the driveshaft flipped to a 180 degree second position in the balance machine.

The method is based upon the use of polar charting to gather data. Referring to FIG. 2, polar charting is a method of expressing data graphically using a pair of numbers. One number of the pair, symbolized herein by the Greek letter "θ", represents a direction (typically expressed from zero degrees to three hundred sixty degrees) from an origin or center point 20, and the other number of the pair, represented by the letter "R" represents a distance from the origin (a Radius). Note that the numbers of this pair can be presented in the order θ, R, or in the order R, θ, as long as the user understands which is which. The polar coordinate graph (which may also be referred to as a polar graph, polar chart, or even a bull's eye graph) is a well-known graphical form by which a point may be plotted on the graph by the distance the point is from an origin point, and by the clockwise angle a line including the point and the origin point forms with a fixed reference line. The fixed reference line is designated as being 0 degrees. The graph typically has additional lines plotted, radiating outwardly from the origin (such as the lines at 90 degrees, 180 degrees and 270 degrees shown in FIG. 2), to facilitate plotting of points at the desired angle θ. Also, circles are typically plotted concentrically about the origin at regularly spaced radii, to facilitate plotting points at the desired radius R.

In the present context, an unbalanced driveshaft or other article is installed on the balancing machine, and the balancing machine is operated to determine (1) if the driveshaft is out of balance and, if so, (2) the location and magnitude of a corrective action that can be taken to counterbalance the imbalances of the driveshaft such that it is balanced for rotation during use. If the driveshaft is out of balance, then the location and magnitude of the imbalance is used to apply correction weights. Once the imbalance is within specification, then location and magnitude of any residual imbalance defines the First Imbalance, and this is plotted as a first data point 21 on a polar coordinate graph, as illustrated on the polar coordinate graph in FIG. 2. Then, without taking any corrective action, the driveshaft or other article is removed from the balancing apparatus and re-installed in a different configuration. Typically, the different configuration is achieved by rotating the driveshaft by one hundred eighty degrees relative to the balancing machine. However, any other angular orientation can be used. The balancing apparatus is again operated so as to define a second data point 22 on the polar coordinate graph, representing measurement of Flip Imbalance. A midpoint 23 between the first and second data points can be calculated using well known mathematical algorithms. Ideally, the data point 22 for Flip Imbalance would be plotted diametrically opposite the data point 21 for First Imbalance, with the same distance from the origin 20, reflecting that the distribution of the imbalance in the driveshaft was unchanged, just oriented oppositely, so that the midpoint 23 would be calculated at the origin. However, due to errors of various types, such as variations in fixing the driveshaft to the fittings, play between components, errors in measuring instruments, etc., frequently the midpoint 23 between the data point 22 for Flip Imbalance and the data point 21 for First Imbalance will not be located at the origin 20, but rather be offset somewhat therefrom, as seen in FIG. 2. This offset is a measure of error, and can be expressed as a vector 24 having magnitude R at angle θ.

Statistically Derived Midpoint Limits for Balancer Process Control

Figure 3:
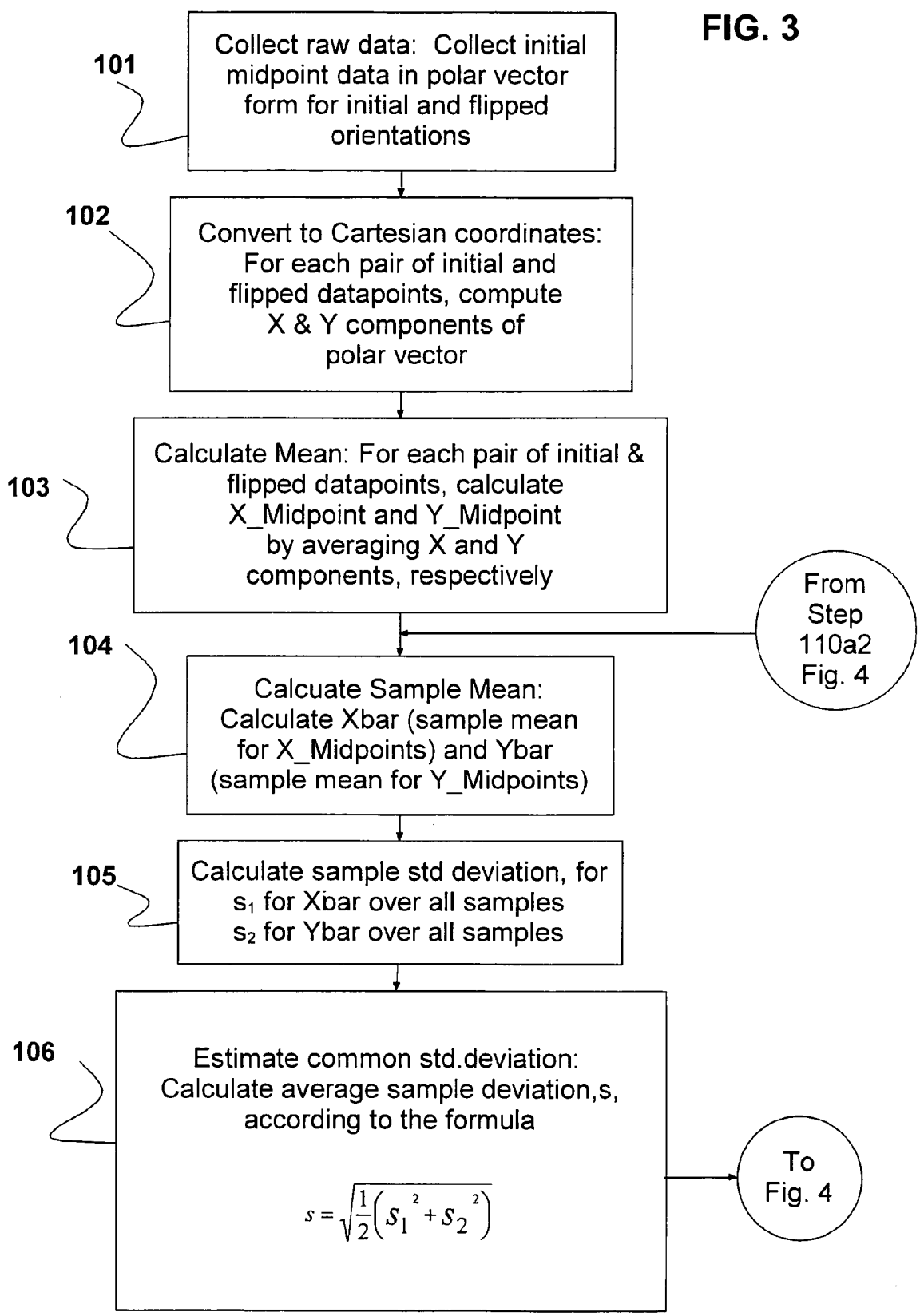
FIGS. 3 through 5 illustrate an aspect of the invention relating to a method for determining process control limits so as to separate midpoints of pairs of balance measurements that are out of statistical control from midpoints that are within statistical control, and using the midpoints that are in statistical control to set warning limits, control limits, and maximum acceptable line-out values.
Figure 4:
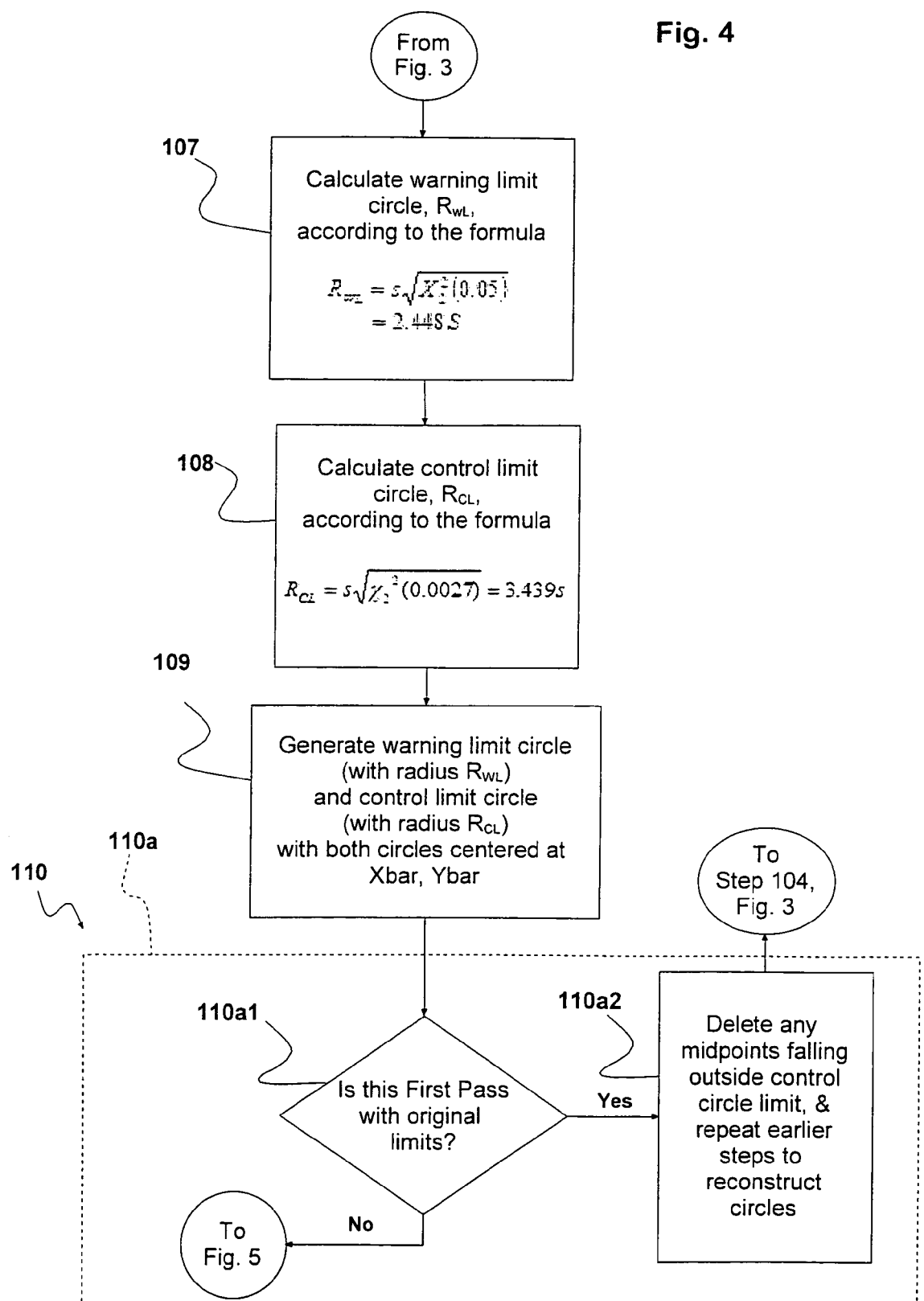
Figure 5:
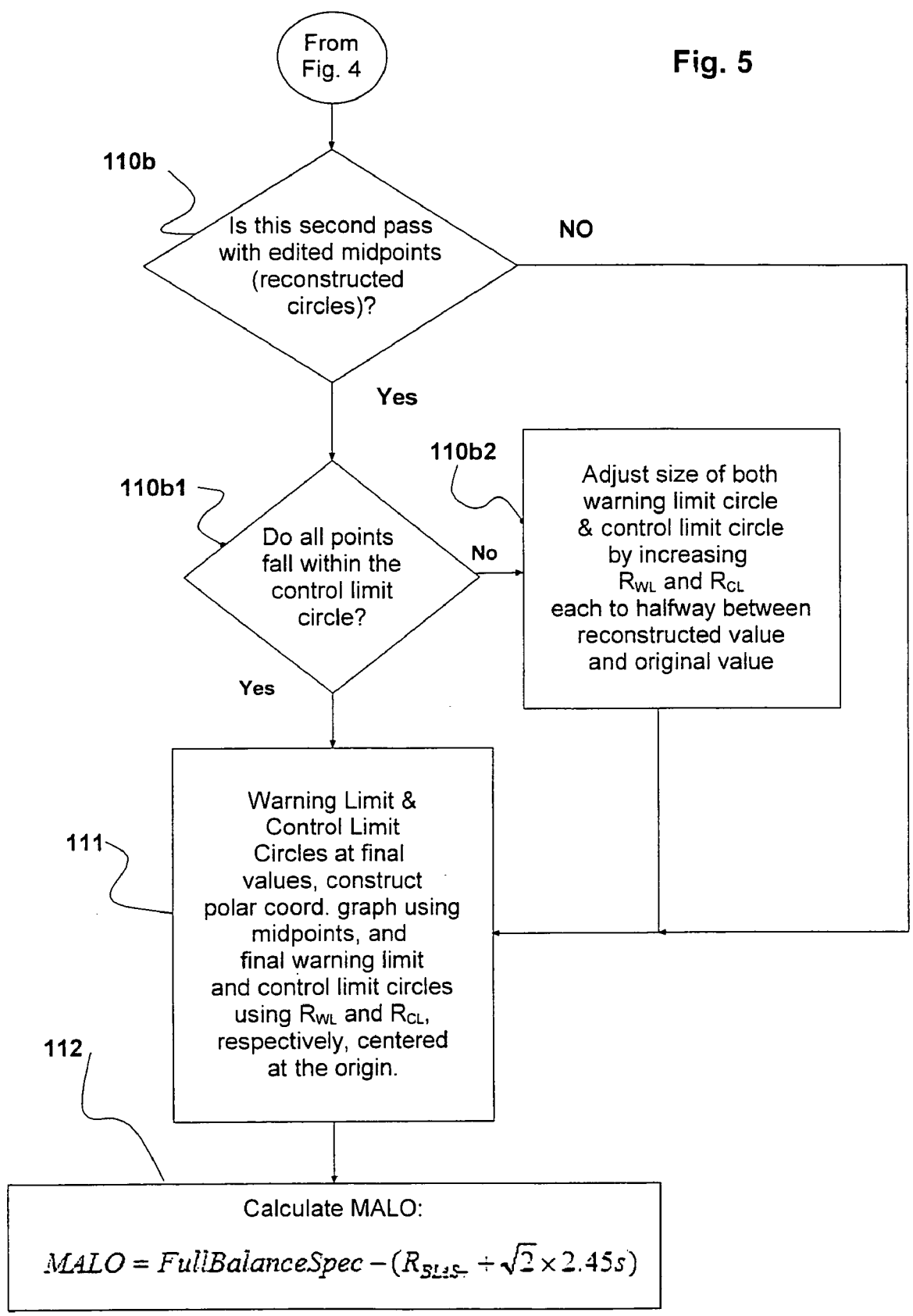

Referring now to FIGS. 3 through 5, there is illustrated an method for choosing balance machine (balancer) imbalance measurement data that will be utilized as inputs for statistical process control. More specifically, the algorithm illustrated therein provides process control limits to separate midpoints that are out of statistical control from the midpoints that are in statistical control (i.e., assignable cause versus common cause variation). This control limit calculation is analogous to the Upper Control Limit on an Xbar chart. It is contemplated that only a sampling of the driveshafts produced by the facility and balanced to produce a data point in an initial orientation will be flipped, generating a second data point representing imbalance in the flipped orientation. The combination of the data point in the initial orientation and in the flipped orientation produces a midpoint (as will be further described below). The midpoints that go into the process control limits are chosen irrespective of the balancer or fixture (contemplating that more than one balance machine may be operated in the facility in which the method is practiced) driveshafts came from. This is because it is contemplated that only 1 out of 20 (or other desired number) of points result in a midpoint, leading to a lack of data for a specific fixture/balancer combination for most part numbers. The steps of the algorithm presented below should be applied to the midpoints at the all planes individually for each specific driveshaft.

According to a first step of the algorithm 101, the raw data is gathered. More specifically, data is collected for a suitably large sample of midpoints (R, θ) for each plane and for each part number (type of driveshaft) from a suitable number of production days. Each midpoint consists of a radius R and an angle θ for both the initial (0 degree) and flipped (180 degree) orientations of the same driveshaft. For example, it is contemplated that in some production facilities, it would be suitable to collect at least 50 midpoints (R, θ) for each plane and for each part number from, at minimum, 5 production days.

According to a second step 102 of the algorithm, the collected data is converted to Cartesian coordinates. More specifically, the step entails computing the X and Y components of the polar vectors (the 0 degree vector and the 180 degree vector) using the formulas:

$$X = R \cos(\theta) \text{ and } Y = R \sin(\theta)$$

According to a third step 103, the mean of the X_Midpoint components is calculated, and the mean of the Y_Midpoint components is calculated. The midpoint components X_Midpoint and Y_Midpoint are calculated by averaging the X components and the Y components for the polar vectors, respectively, from the initial and flip data (data taken with driveshaft in the flipped position).

As an aside, although this calculation is not necessary to practice the invention, it is noted that R_Midpoint, the radius or magnitude of the midpoint vector, may be calculated according to the formula:

$$R\_Midpoint = \{[(X\_Midpoint)^2 + (Y\_Midpoint)^2]/2\}^{1/2},$$

where R_Midpoint is distributed as $\sqrt{\sigma^2 W^2}$, and where $W^2$ is a variable that is distributed as the chi-square with 2 degrees of freedom (df).

It is further noted that steps 102 and 103 are performed for each midpoint from the initial and flip data (i.e., for 50 pairs of 0 degree and 180 degree vectors).

In a fourth step 104, calculate the sample mean for X_Midpoint and Y_Midpoint, labeling them Xbar and Ybar, respectively, and calculate the R (magnitude) and angle of the resultant vector.

In a fifth step 105, compute the sample standard deviations $s_1$ and $s_2$ for X_Midpoints (over all 50 points) and Y_Midpoints (over all 50 points), respectively. These are estimates of the population or true standard deviation $\sigma$ for these midpoint coordinates.

In a sixth step 106, the common standard deviation, $\sigma$, is estimated by calculating the average sample standard deviation, s, (which approximates $\sigma$) using the formula:

$$s = \sqrt{\frac{1}{2}(s_1^2 + s_2^2)}.$$

In a seventh step 107, compute $R_{WL}$, the radius of the warning limit circle, using the critical value $\chi_2^2$ (0.05) =5.988 (corresponding to an upper-tail chi-square (with two degrees of freedom) probability of 0.05) using the formula:

$$R_{WL} = s\sqrt{\chi_2^2(0.05)} = 2.448s.$$

This gives the 95% limit.

In a eighth step 108, compute $R_{CL}$, the radius of the control limit circle, using the critical value $\chi_2^2$ (0.0027)= 11.827, corresponding to an upper-tail chi-square (with 2 df) probability of 0.0027 using the formula:

$$R_{CL} = s\sqrt{\chi_2^2(0.0027)} = 3.439s.$$

This gives the 99.73% limit.

It should be noted that other upper-tail probabilities other than 0.05 or 0.0027 could suitably be used in the above (in steps 107 and 108) calculations of $R_{WL}$ and $R_{CL}$, respectively.

In a ninth step 109, calculate the points of the warning limit and control limit circles to compare the midpoints to the warning and control limits, using radii $R_{WL}$ and $R_{CL}$, respectively, and centered at the origin. The following formulas can be used to generate the points of these circles:

for the warning limit circle:

$$y' = \pm\sqrt{s^2\chi_2^2(0.05) - x'^2} = \pm\sqrt{5.988s^2 - x'^2};$$

for the control limit circle:

$$y' = \pm\sqrt{s^2\chi_2^2(0.0027) - x'^2} = \pm\sqrt{11.827s^2 - x'^2};$$

where y' and x' are transformed by Xbar and Ybar respectively:

$$(y' = y - Ybar, \text{ and } x' = x - Xbar).$$

In a tenth step 110, decisions are made depending on the iteration of the tenth step 110 that is taking place. In a preferred embodiment, single pass editing is performed on the data to effectively decrease the control limits which will be applied.

More specifically, in a first decision step 110a1 it is determined if this is the first iteration of the tenth step 110. If this is the first pass with the original limits (i.e., during the first iteration of the tenth step 110), then in an editing step 110a2 delete any midpoints that fall outside the control-limit circle and repeat the fourth through ninth steps, 104–109, once.

Otherwise, in a second decision step 110b, a check is made to determine if this is the second pass and editing of the original midpoints has been performed.

If the answer is no, then the warning limit and control limit circles are already at their final values, and the method proceeds to an eleventh step 111. Otherwise, if the answer to determination made in the second decision step 110b is yes, then a check is made, in a third decision step 110b1, to determine if no points fall outside the reconstructed control limit circle, in which case the warning limit and control limit circles are considered as the final ones. However, if the check made in the third decision step 110b1 reveals that one or more points fall outside the reconstructed control-limit circle, then in a subsequent step 110b2 adjust the size of both the warning-limit and control-limit circles by increasing the radii $R_{WL}$ and $R_{CL}$ each to halfway between their reconstructed value and their original value.

Figure 6:
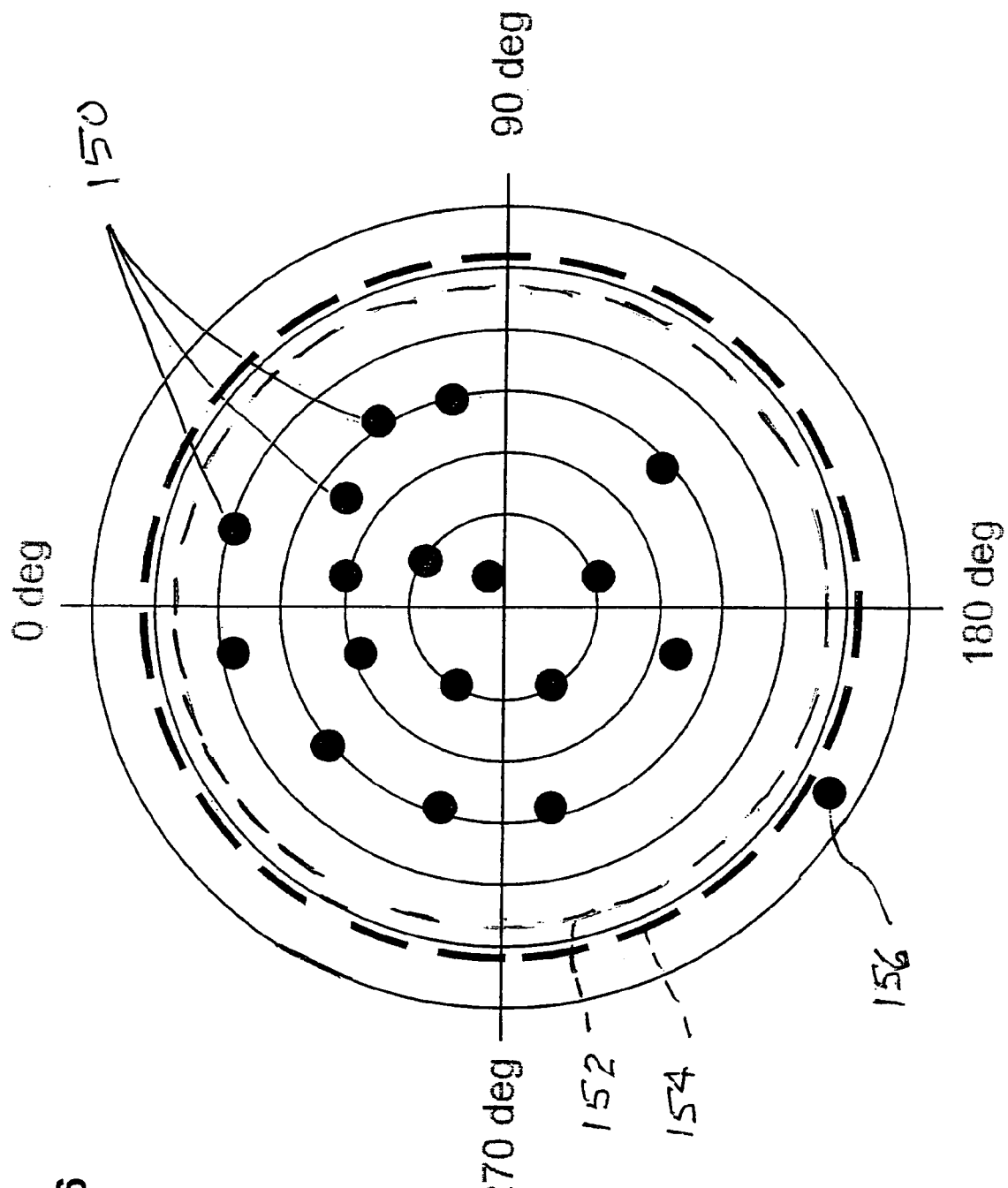
FIG. 6 is an exemplary polar coordinate graph with warning limit circle, control limit circle and sample midpoint data points plotted thereon.

In the eleventh step 111, construct a polar coordinate graph, plotting the midpoints and final warning limit and control limit circles, using radii $R_{WL}$ and $R_{CL}$, respectively and centered at the origin. This is illustrated in FIG. 6, where various midpoints 150 are plotted on the graph. The magnitude of the error associated with the midpoints 150 increases the further away from the origin at the center of the graph the midpoint 150 is located. The warning limit circle, indicated at 152, is a circle of constant magnitude (radius from the origin). Similarly, the control limit circle indicated at 154, has a somewhat larger magnitude than the warning limit circle 152. Points outside of the control limit circle 154, such as the point 156, are out of control points.

It should be noted that, rather than accepting the warning limit circle produced by the above steps, it is contemplated that a user may wish to use a warning limit circle with a radius that is a fixed amount (with a radius less than the radius of the control limit circle), to use as a manual override of the calculated warning limit. That is, it may be desirable to plot a circle with a fixed measure of imbalance, such as a 0.10 in-oz circle. This fixed value circle could then be substituted for the warning limit circle in some situations. Such an override limit could be utilized as a target or "stretch goal". In a preferred embodiment, the method according to this invention is implemented on a computer. Thus it would be desirable to provide the capability in the computer program implementing the method of this invention to plot and utilize such a substitute warning limit circle, having a radius chosen by the user.

In a twelfth step 112, calculate MALO (Maximum Acceptable Line-Out at the 95% confidence level). MALO, as used herein, represents the maximum allowable imbalance in a driveshaft for which no corrective action will be required; i.e., the maximum line-out value that should be set. As used herein, the term line-out value is the value (magnitude) of an imbalance in a driveshaft for which no corrective action will be taken. MALO is calculated using the following formula:

$$\text{MALO} = \text{FullBalanceSpec} - (R_{BIAS} + \sqrt{2}*2.45s),$$

where: FullBalanceSpec (variable name for Full Balance Specification) is the total balance tolerance; i.e., the specification for maximum imbalance permissible to remain after corrective action has been taken; $R_{BIAS}$ is the magnitude of the bias, i.e., the difference between the average midpoint and the origin, and 2.45s is the 95% point of the distribution for R_Midpoint.

Note that in the formula for MALO, the term 2.45s is multiplied by $\sqrt{2}$ because the variance of imbalances (0 or 180 degree orientations) is equal to 2 times the variance of the midpoints (i.e. $s = \sqrt{\sigma^2/n}$ where n=2 since midpoints are the average of the 0 and 180 degree imbalances). This implicates the individual imbalances.

MALO gives an indication of whether the driveshafts are being balanced to an appropriate line-out value or not. A negative MALO indicates measurement system variation and bias that exceeds the full specification and which cannot be compensated for by decreasing the magnitude of the line-out value.

Ongoing Process Control

Figure 7:
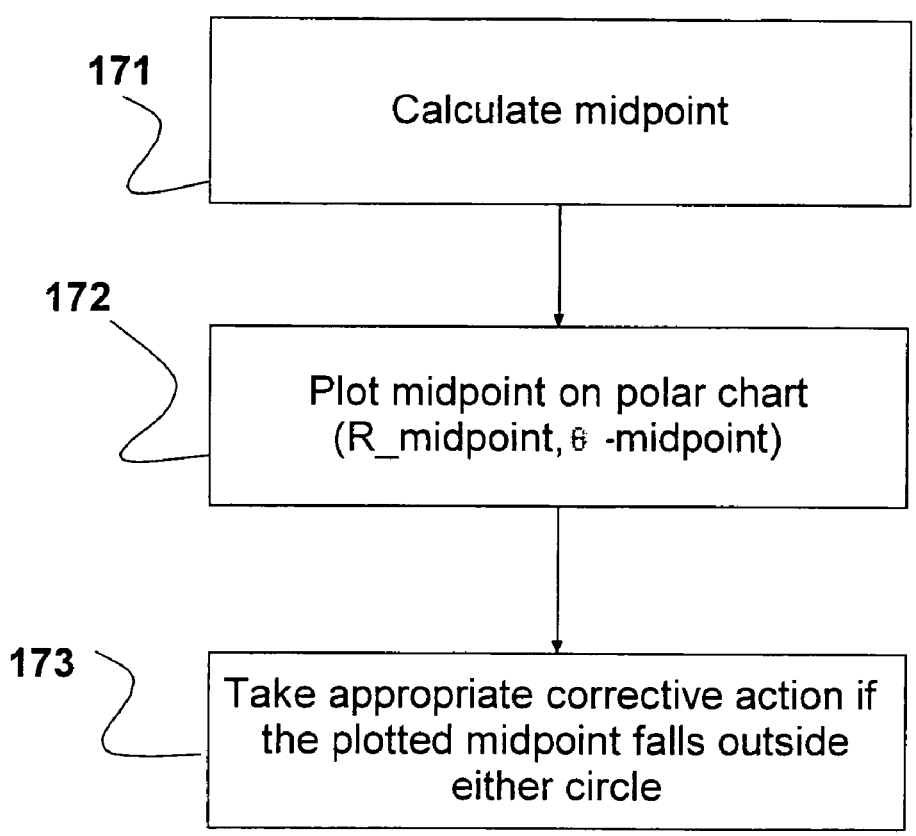
FIG. 7 illustrates another aspect of the invention relating to a method of collecting additional midpoint data for ongoing process control.

According to another aspect of this invention, illustrated in FIG. 7, additional midpoint samples must be collected per the polar charting frequency requirement for flips and analyzed as follows:

In a first step 171, the midpoint are calculated as shown above.

In a second step 172, plot the midpoint (R_Midpoint, θ_Midpoint) on the polar coordinate graph.

Finally, in a third step 173, check to see if the midpoint falls outside of either the warning limit circle or the control limit circle. Reaction plans should be created in order to decide what action is to be taken when these occur. If the midpoint falls outside the control limit circle, all the driveshafts produced since the last sample are treated as suspect.

It will be appreciated that the control limit circle and the warning limit circle should be periodically recalculated, based on the most recent data, to enable ongoing process control. For example, the midpoint control and warning limits may suitably be recalculated periodically, such as daily or weekly, using a set number of the last midpoint data points, such as the last 50 midpoints. If the through-put of the facility is such that there are not the desired number of midpoints available (for example, 50 midpoints), the limits can be calculated with a lower number of midpoints.

As discussed above, there is preferably an option to set the midpoint warning limits at a fixed value (rather than calculating them). This may be useful, for example, for a manager who is responsible for the product and process performance and quality who wishes to implement reaction plans based on the warning limits. Such a manager may, for example, want the warning limits to be smaller than the calculated limits for problem driveshafts.

Initial Imbalance

According to a further aspect of the method according to our invention, the initial imbalance (before any corrective action is taken to improve balance is performed) of the driveshafts (or other product being tested for balance) is monitored on an ongoing basis. Note that the initial imbalance differs from the First Imbalance measurement discussed above. The initial imbalance is a measure of the imbalance in the driveshaft before balance weights have been added, or material removed, to bring the driveshaft into a condition with a residual imbalance within a pre-determined tolerance, the line out value. Only after the driveshaft has been brought into a condition with the residual imbalance no larger than the line out value is the First Imbalance measurement taken. Only in the case where the initial imbalance is less than the line-out value will the initial imbalance be the same as the First Imbalance—because if the initial imbalance is no larger than the line out value, then no corrective action will be taken to change the imbalance in the shaft.

High initial imbalance reduces balance capability because high initial imbalance increases the effect of driveshaft looseness on balance capability. The term driveshaft looseness refers to the play in the components supporting the driveshaft for rotation, allowing an otherwise balanced driveshaft to be rotated eccentrically, resulting in an erroneous imbalance measurement. Imbalance in the driveshaft being rotated on the balance machine accentuates this effect. Therefore, this aspect of the method according to our invention provides a capability to address driveshafts with excessive initial imbalance. The initial imbalance of a driveshaft Must have a field for an upper specification (which will be determined by procedure, by the customer or established by the manager who is responsible for the product and process performance and quality).

As will become apparent by reference to the text below and by reference to FIGS. 8 through 10, the steps to perform initial imbalance process monitoring are somewhat similar to the method described in the section "Statistically Derived Midpoint Limits for Balancer Process Control" above, illustrated in FIGS. 3 through 5. However, data will be collected only from measurements with the driveshaft in the 0 degree (initial) position, and so no midpoint calculations will be required. Additionally, it is noted that $C_{PK}$ should be calculated by the histogram method because the underlying distribution is not always normal. $C_{PK}$ stands for Process Capability Index, which is an term of art in the industry. $C_{PK}$ is an indication of the performance of the process in question; here it is an indication of the range of variation of residual imbalance that parts will exhibit after initial imbalance is measured and any corrective action (balancing) is taken.

Figure 8:
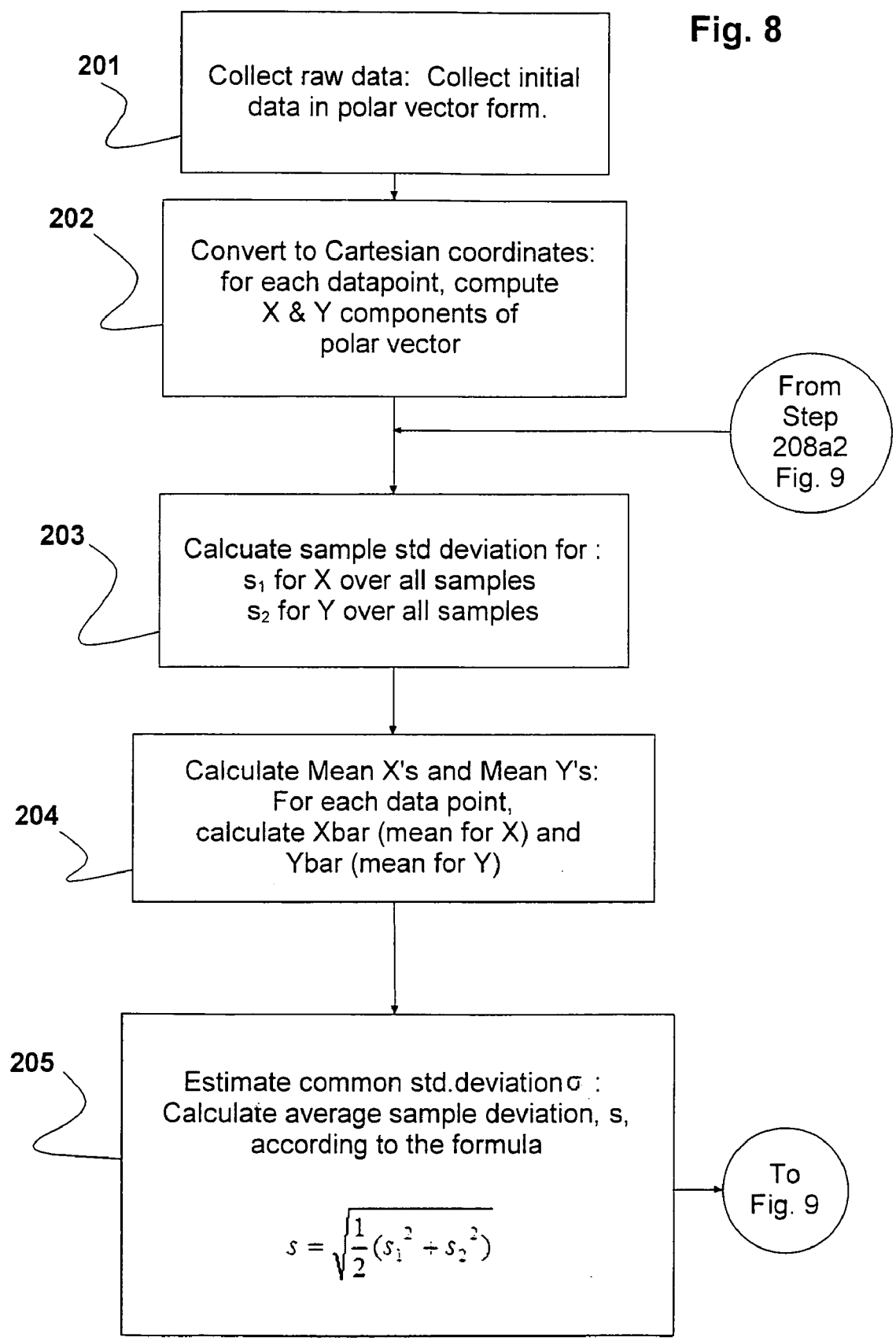
FIGS. 8 through 10 illustrate another aspect of the invention relating to a method for determining initial imbalance of a component to be balanced, and monitoring historical averages of initial imbalance.
Figure 9:
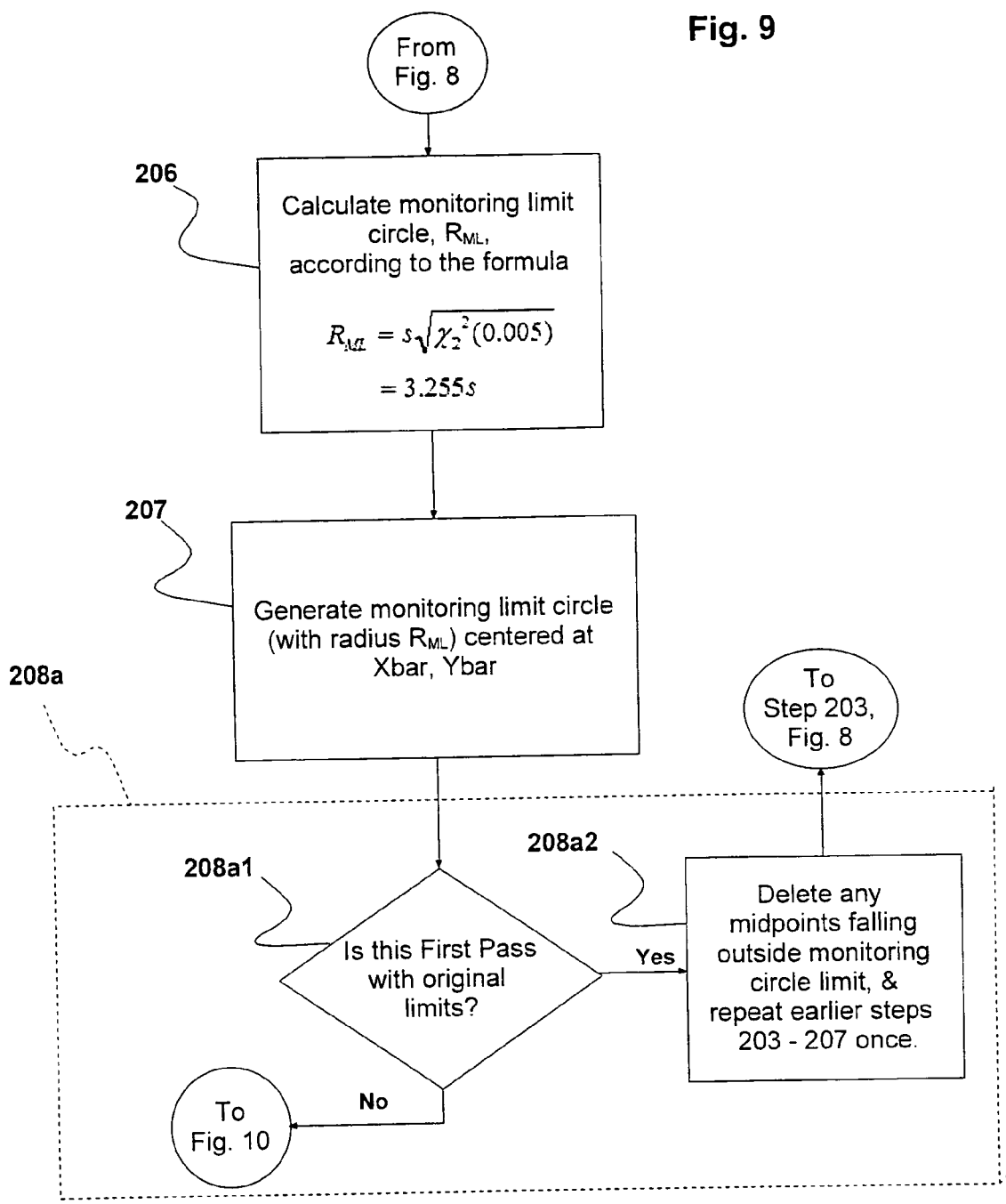

Referring now to FIG. 8, in a first step 201, the raw data is gathered. More specifically, initial imbalance data is collected on driveshafts in the 0 degree orientation for a suitably large sample of midpoints (R, θ) for each plane and for each part number (type of driveshaft). For example, it is contemplated that in some production facilities, it would be suitable to collect at least 50 points (R,θ) for each plane and for each part number from the 0 degree orientation for initial imbalance. Each point consists of a radius R and an angle θ.

In a second step 202, the collected data is converted to Cartesian coordinates. More specifically, compute the X and Y components of the polar vectors (all 50 points) using the formulas:

$$X=R\cos(\theta) \text{ and } Y=R\sin(\theta)$$

In a third step 203, compute the sample standard deviations $s_1$ and $s_2$ for X (over all 50 points) and Y (over all 50 points), respectively. These are estimates of the population or true standard deviation θ for these coordinates.

In a fourth step 204, calculate the mean X and mean Y for each of the 50 points. The mean X for the 50 points is Xbar, and the mean Y for the 50 points is Ybar. The coordinate (Xbar, Ybar) represents the center of the initial balance cluster.

In a fifth step 205, the common σ is estimated. The average sample standard deviation s approximates the common σ, and may be calculated using the formula:

$$s = \sqrt{\frac{1}{2}(s_1^2 + s_2^2)}.$$

In a sixth step 206, using the critical value $\chi_2^2$ (0.005) =10.597 (corresponding to an upper-tail chi-square (with two degrees of freedom) probability of 0.005) compute $R_{ML}$, the radius of the monitoring limit circle.

$$R_{ML}=s\sqrt{\chi_2^2(0.005)}=3.255s.$$

This gives the 99.5% limit.

In a seventh step 207, construct the polar coordinate graph plotting the initial imbalances and monitoring limit circle using radius $R_{ML}$ and centered at the origin. Note that the following formula can be used to generate the points of the monitoring limit circle:

$$y' = \pm\sqrt{s^2\chi_2^2(0.005) - x'^2} = \pm\sqrt{10.597s^2 - x'^2},$$

where y' and x' are transformed by Xbar and Ybar respectively:

$$(x'=x-X\text{bar, and } y'=y-Y\text{bar}).$$

In an eighth step 208, decisions are made depending on the iteration of the eighth step 108 that is taking place. In a preferred embodiment, single pass editing is performed on the data.

More specifically, in a first decision step 208a1 it is determined if this is the first iteration of the eighth step 208. If this is the first pass with the original limits (i.e., during the first iteration of the eighth step 208), then in an editing step 208a2 delete any midpoints that fall outside the monitoring limit circle and repeat the third through seventh steps, 204–207, once.

Figure 10:
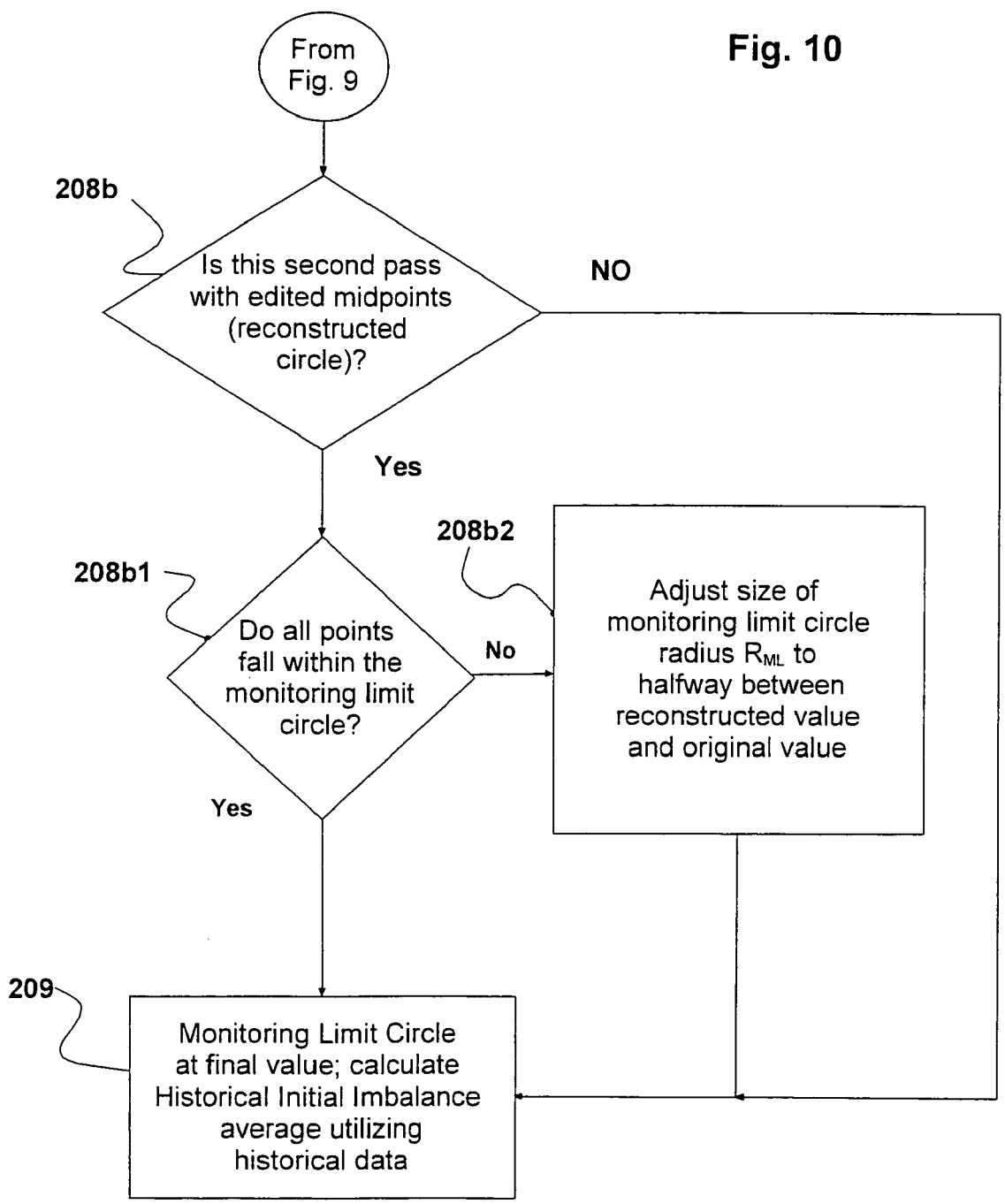
Figure 11:
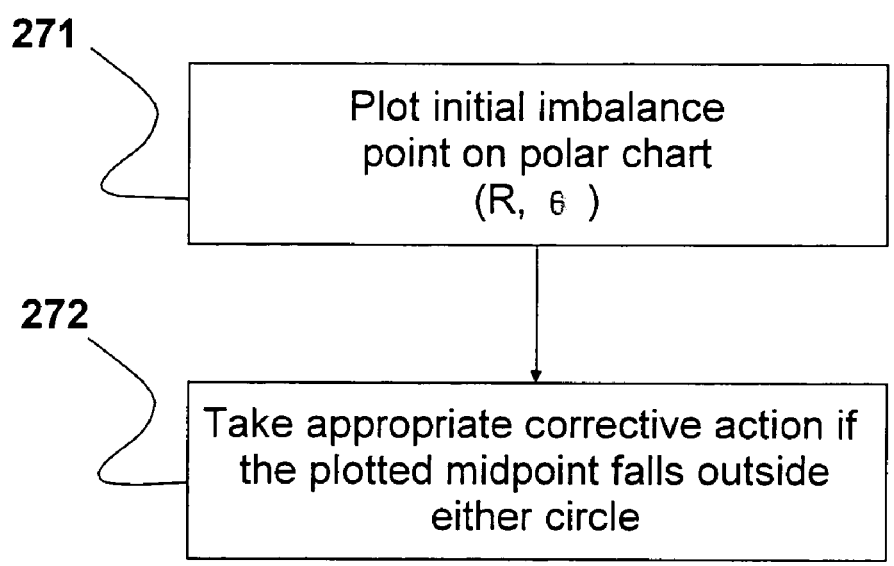
FIG. 11 illustrates another aspect of the invention relating to a method of collecting additional initial imbalance data for ongoing process monitoring.
Figure 12:
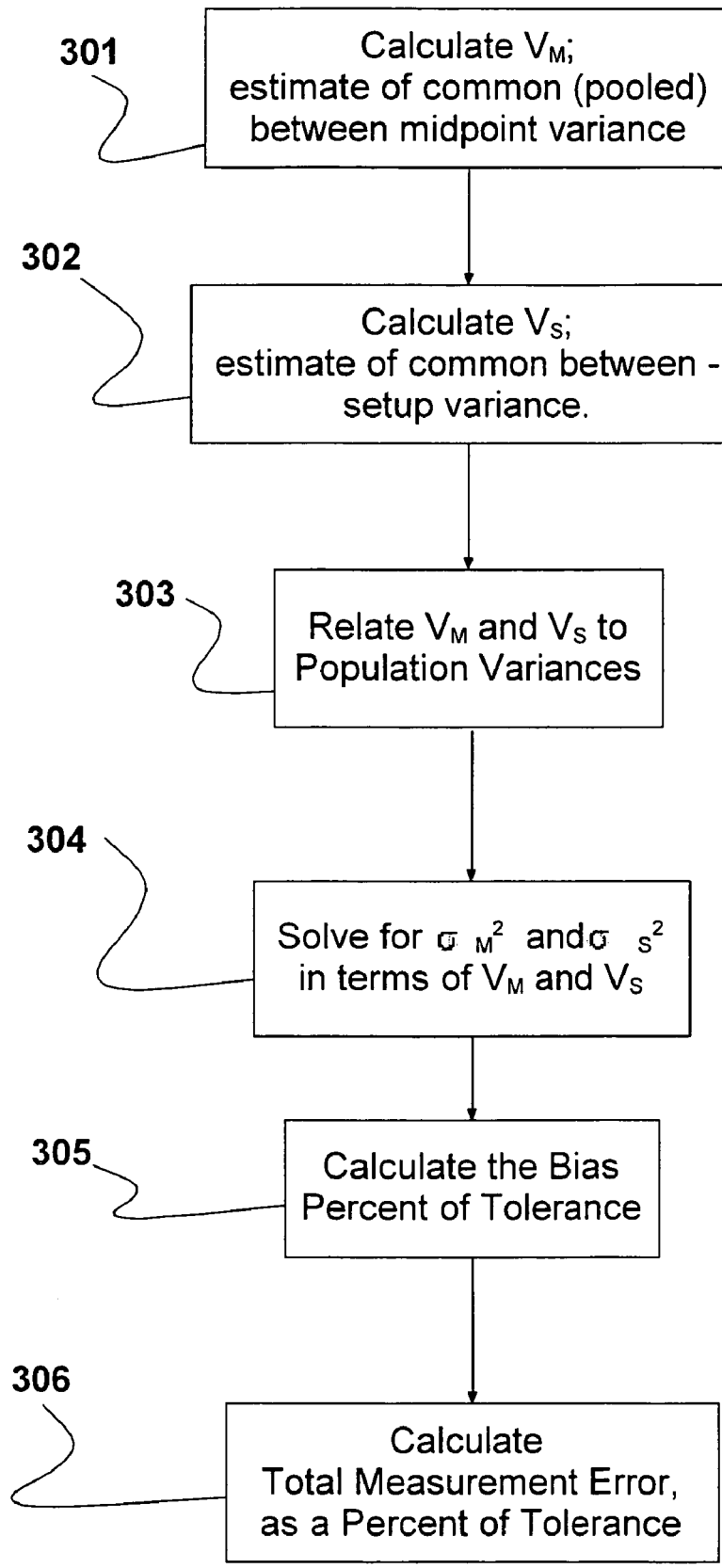
FIG. 12 illustrates another aspect of the invention relating to a method for calculating the components of variation in imbalance measurements, including midpoint variation within a setup (repeatability) and setup-to-setup midpoint variation (reproducibility).
Figure 13:
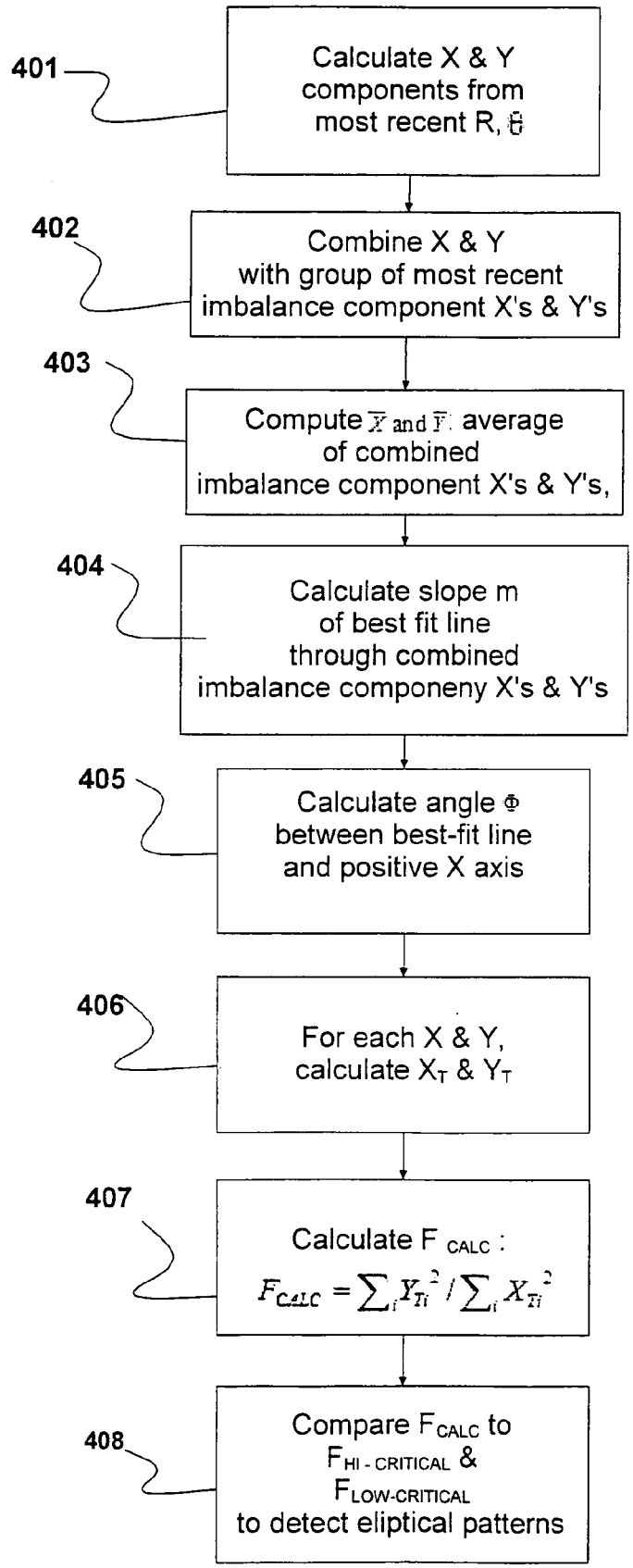
FIG. 13 illustrates another aspect of the invention relating to the use of cluster shape analysis for identification of assignable causes that impact the repeatability of imbalance measurements of a product.

Otherwise, in a second decision step 208b, shown in FIG. 10, a check is made to determine if this is the second pass and editing of the original midpoints has been performed. If the answer is no, then the monitoring limit circle is already at its final value, and the method proceeds to a ninth step 209. Otherwise, if the answer to determination made in the second decision step 208b is yes, then a check is made, in a third decision step 208b1, to determine if no points fall outside the reconstructed monitoring limit circle, in which case the monitoring limit circle is considered as the final one. However, if the check made in the third decision step 208b1 reveals that one or more points fall outside the reconstructed monitoring limit circle, then in a subsequent step 208b2 adjust the size of the monitoring limit circle by increasing the radius $R_{ML}$ to halfway between its reconstructed value and its original value.

It should be noted that other upper-tail probabilities other than 0.005 could be used in the above $R_{ML}$.

In a ninth step, 209, calculate a historical initial-imbalance value by taking historical data from a suitable period, such as the last 6 months or the last year, and calculating the average initial imbalance (irrespective of angle). This information may be kept as a single computed value, or may be displayed as a circle on a polar coordinate graph, centered on the origin with a radius equal to the historical initial-imbalance value.

It should be noted that it may be desirable to provide a manual override for a computer program implementing this method, to facilitate easy examination of initial imbalance data relative to a limit different from the monitoring limit circle calculated in the preceding steps.

As driveshafts are received and measured for imbalance, comparison of the initial imbalance data with the monitoring limit circle will permit rapid, real-time feedback to the supplier of the driveshafts regarding the effects of changes in the supplier's processes that may be adversely (or positively) affecting the initial imbalance of the driveshafts.

Ongoing Process Monitoring

To facilitate ongoing process monitoring, additional initial imbalance samples can be collected as follows:

In a first step 271, obtain an additional imbalance measurement, and plot the initial imbalance point (R,θ) on the polar coordinate graph on which is drawn the monitoring limit circle.

In a second step 272, check to see if the point falls outside of the monitoring limit circle; if it does, this is an indication that initial imbalance of the measured driveshaft is outside of the usual levels, and that corrective action may be indicated. To facilitate rapid response to this situation, typically reaction plans would be created in order to decide what action is to be taken when this occur.

As a further part of ongoing process monitoring, it is expected that monitoring limits should be recalculated after each setup using a moving set of historical data, such as, for example, the last 1000 initial-imbalance points or using 100 initial-imbalance points over a given period of time, such as over at least 1 month of data, which would typically result in the data being collected over several setups, perhaps over 10 to 15 setups in a month in some applications. As before, it may also be desirable to have the ability to set monitoring limits manually (e.g., to a fixed value) by a user (such as a manager who is responsible for the product and process performance and quality) Such an ability could be provided in a computer program by using a input field for selecting the value desired in a computer program generating the polar coordinate graph and plotting the data points thereon.

Measurement Error Analysis (MEA)

In a further aspect of the invention, analysis of the measurement error (the error observed by the balancing system) is facilitated. In general, the imbalance measurement reported by the balancer (the Observed Value) is the sum of many components, as is shown in the following formula:

Observed Value=(Part Mean+Bias)+Part Effect+Appraiser Effect+Replication Error

In the aspect of our invention relating to using statistically derived midpoint limits for balancer process control, described above and illustrated in FIGS. 3 through 5, the Observed Value is equal to the observed midpoint value and the part mean is equal to zero (i.e. midpoint values are >0 only due to bias, part effect, setup effect and replication error—in other words the midpoint would be at the origin in the absence of these). The Appraiser Effect is the effect due to setup variation. Thus the above general equation for Observed Value, can be rewritten specifically for observed midpoint values thusly:

Observed Midpoint Value=Bias+Part Effect+Setup Effect+Replication Error

Mathematically this is expressed as:

$$Y_{ijm} = b + \alpha_i + \beta_j + e_{ijm}$$

where $Y_{ijm}$ is the observed midpoint value, b is the midpoint bias (i.e. the average distance from the origin), $\alpha_i$ is the variation due to the part, $\beta_j$ is the error due to setup variation, and $e_{ijm}$ is replication error.

With this algorithm it is important to note that part variation will be confounded with replication error. This is due to the fact that no repeated measures of a driveshaft are taken. In addition, balancer and fixture variation are confounded with setup variation and replication error. This confounding can be eliminated by limiting the analysis to a specific fixture and balancer combination.

The objective of this Measurement Error Analysis is to calculate the components of variation due to Midpoint variation within a setup (repeatability), and due to setup-to-setup midpoint variation (reproducibility). Midpoint variation (repeatability) within a setup will be calculated by determining the standard deviations of the values of X_Midpoint and Y_Midpoint within a setup and averaging them over all of the setups. Setup-to-setup midpoint variation (reproducibility) will be calculated by determining the average midpoint for each setup and taking the standard deviation of these averages.

The X and Y Bias's will be calculated by averaging the values of X_Midpoints and Y_Midpoints respectively and converting the resultant (Xbar, Ybar) to polar coordinates. The magnitude, Rbar, of this vector will be the midpoint BIAS.

The following procedure is for X_Midpoint and Y_Midpoint. The X_Midpoint and Y_Midpoint are normally distributed with a mean of 0 and a variance of $\sigma^2$, whereas R_Midpoint is distributed as $\sqrt{\sigma^2 W^2}$ (as indicated above $W^2$ is a variable that is distributed as the chi-square with 2 degrees of freedom (df)). One midpoint per driveshaft is measured from the 0 degree and 180 degree orientations. The manner in which this data is collected on a production basis is a 'nested' arrangement. There is one midpoint per measurement plane per driveshaft. At least two flips of the driveshafts has to have occurred during the setup for the data to be considered. Note that a setup, as used herein, means an instance of operation of the balancing system from the time of an instance of installing and balancing a particular fixture on a particular balancing machine and calibrating the machine, until the fixture is removed or the machine is re-calibrated. The number of midpoints, measured for the s-th setup, denoted by $M_S$ generally is 2 or more. Denote the index for midpoint as m. Repeatability is comprised of the components of variation due to within driveshaft variation, driveshaft-to-driveshaft variation and replication error. The reproducibility is comprised of the components of variation due to setup. Balancer and fixture contribution to reproducibility is confounded with the setup reproducibility but can be separated out by performing an analysis on each fixture and balancer separately using the same algorithm as shown below. Denote by S the number of setups used in the Measurement Error Analysis according to this method.

In a first step 301, compute $V_M$, an estimate of the common (pooled) between-midpoint variance within one setup, $V_M$. The variation in midpoints represented $V_M$ is typically largely due to repeatability limitations of the balancing system. $V_M$ is defined by the following formulas (1), (2) and (3):

$$V_{MX} = \left\{ \sum_s \left[ \sum_m (X_{sm} - \bar{X}_s)^2 / (M_s - 1) \right] \right\} / S; \quad (1)$$

$$V_{MY} = \left\{ \sum_s \left[ \sum_m (Y_{sm} - \bar{Y}_s)^2 / (M_s - 1) \right] \right\} / S; \text{ and} \quad (2)$$

$$V_M = (V_{MX} + V_{MY})/2; \quad (3)$$

where S is the number of setups, $M_S$ is the number of midpoints in the s-th setup; m is the index for midpoint; $V_{MX}$ is the estimate of the variance of the X components of midpoint data collected within the s-th setup, $V_{MY}$ is the estimate of the variance of the Y components of midpoint data collected within the s-th setup, $X_{sm}$ is the m-th X_Midpoint within the s-th setup, X_Midpoint is the X component of a midpoint, $\bar{X}_s$ represents the average X_Midpoint for the s-th setup, $Y_{sm}$ is the m-th Y_Midpoint within the s-th setup, Y_Midpoint is the Y component of a midpoint, and $\bar{Y}_s$ represents the average Y_Midpoint for the s-th setup.

Note that an assumption is made that $X_{sm}, Y_{sm} \sim N(0, \sigma^2)$ over the long run; that is, that $X_{sm}, Y_{sm}$ are distributed normally with a mean of zero and a variance of $\sigma^2$.

In a second step 302, compute setup variation, $V_s$, an estimate of the common between-setup variance. $V_S$ is a measure of how groups of midpoint data vary from setup to setup. Note that the first step 301 and the second step 302 may be performed in any order. $V_S$ may be calculated according to the following formulas (4), (5), and (6):

$$V_{SX} = \left[ \sum_s [(M_S)(\bar{X}_S - \bar{X})^2] \right] / \left( \sum_s M_S - M_S \text{Bar} \right); \quad (4)$$

$$V_{SY} = \left[ \sum_s [(M_S)(\bar{Y}_S - \bar{Y})^2] \right] / \left( \sum_s M_S - M_S \text{Bar} \right); \text{ and} \quad (5)$$

$$V_S = (V_{SX} + V_{SY})/2 \quad (6)$$

where $M_S$Bar is the average number of midpoints in a setup $$M_S \text{Bar} = \left( \sum_s M_S - \sum_s M_S^2 / \sum_s M_S \right) / (S-1);$$

$\bar{X}_s$ is the average X_Midpoint for the s-th setup, X_Midpoint is the X component of a midpoint, $\bar{Y}_s$ is the average Y_Midpoint for the s-th setup, Y_Midpoint is the Y component of a midpoint, $\bar{X}$ is the average X_Midpoint for all setups, $\bar{Y}$ is the average Y_Midpoint for all setups, $V_{SX}$ is the estimate of the common between-setup variance of the X components of midpoint data, $V_{SY}$ is the estimate of the common between-setup variance of the Y components of midpoint data, $M_S$ is the number of midpoints in the s-th setup, and S is the number of setups.

Note that an assumption is made that $X_{sm}, Y_{sm} \sim N(0, \sigma^2)$ over the long run.

In a third step 303, the estimates of setup variation ($V_S$) and midpoint variation ($V_M$) are related to population variances as follows:

| Estimate | Population Variance Estimated |
|---|---|
| $V_S$ (setup variation) | $\sigma_S^2 + (\sigma_M^2 / M_S \text{Bar})$, |
| where $M_S \text{Bar} = \left( \sum_s M_S - \sum_s M_S^2 / \sum_s M_S \right) / (S-1);$ | |
| $V_M$ (midpoint variation) | $\sigma_M^2$ |

In a fourth step 304, solve for $\sigma_M^2$ and $\sigma_S^2$ in terms of $V_M$ and $V_S$:

$$\sigma_M^2 = V_M;$$

$$\sigma_S^2 = V_S - \sigma_M^2 / M_S \text{Bar}.$$

Note that $\sigma_M^2/M_S$Bar represents the replication error.

As noted above, Repeatability is composed of the components of variation due to within driveshaft variation, driveshaft-to-driveshaft variation, and replication error. This can be represented by the equation:

Repeatability=Equipment Variation (EV).

Furthermore,

EV=5.15$\sigma_M$, where $\sigma_M$ is the standard deviation of the midpoints.

The factor 5.15 is used because the equation is being applied to normal data, that is, because the midpoint components x and y are normally distributed. Since the method is calculating the common variance that comes from the x and y components, it is appropriate to utilize the factor 5.15 in calculating EV from $\sigma_M$.

Repeatability error is dependant upon part variation (both variations within the structure of a part (not straight, not uniform in wall thickness, etc.), and between parts (because no two parts are exactly, precisely the same)) and replication error, which relationships may summarized as:

Repeatability error=part variation (within+between)+replication error.

Now consider Reproducibility:

Reproducibility=Setup variation (also called Appraiser Variation, AV), where AV=5.15$\sigma_S$.

As the case with Repeatability, the factor 5.15 is used because the equation is being applied to normal data. Since the method is calculating the common variance that comes from the x and y components, it is appropriate to utilize the factor 5.15 in calculating AV from $\sigma_S$.

The components of variation due to Repeatability & Reproducibility (R&R) can be calculated utilizing the formula:

R&R=$\sqrt{EV^2+AV^2}$.

It may be useful to examine R&R as Percent of Tolerance:

% EV=100 (EV/Total Tolerance),

% AV=100 (AV/Total Tolerance), and

% R&R=100 (R&R/Total Tolerance), where TotalTolerance=MaxIMBalanceSpec×2/$\sqrt{2}$. The Total Tolerance is represented by TotalTolerance in the above equation. As may be seen, the Total Tolerance is related to the specified maximum allowable imbalance (MaxIMBalanceSpec) (which may set, for example, by a customer specifying the maximum allowable imbalance the customer will accept in products from suppliers, or set by the user to achieve various quality goals). The variances used in the R&R calculations are calculated taking angle into account (therefore a +/− specification must be applied). The variances of midpoints are ½ the variances of *imbalances*. T*he* tolerance is the maximum amount of imbalance accepted in any *direction*. He*n*ce, since the imbalance components can be negative or *positive*, the +/− maximum allowable imbalance must be considered in the T*otal Tolerance* (hence M*a*xIM*balance*S*pec* X 2). This number is then divided by $\sqrt{2}$ because the standard error of the midpoints is equal to the standard error of the mean. This is equal to the common s of imbalances divided by $\sqrt{2}$. Since midpoints are being evaluated, the tolerance has to be divided by $\sqrt{2}$.

In a fifth step 305, calculate the Bias Percent of Tolerance utilizing the following formulas:

$$X_{Bias} = \sum_{i=1}^{N} X\_Midpoint/N;$$

$$Y_{Bias} = \sum_{i=1}^{N} Y\_Midpoint/N; \text{ and}$$

$$R_{Bias} = \sqrt{(X_{Bias}^2 + Y_{Bias}^2)},$$

where $N = \sum_S M_S$ and %BIAS $$= 100(R_{BIAS})/(\text{Total Tolerance}), \text{ and where}$$

TotalTolerance = MaxIMBalanceSpec×2/$\sqrt{2}$.

In a sixth step 306, calculate total Measurement Error as a Percent of Tolerance according to the following formula:

% Error=% Bias+% R&R

According to this aspect of our invention, balancer comparisons can be made by doing the above analyses for each balancer (balance machines) for a specific part number. Additionally, fixture comparisons can also be made by doing the above analyses for each fixture for a specific part number. These comparisons may be useful, for example, to identify equipment that may not be performing as well it could be, and thus deserving of scrutiny to determine why the % Error for a particular balancer or fixture is higher than that of other balancers.

Cluster Shape Analysis (For Elliptical Patterns)

According to another aspect of our invention, an algorithm is provided to provide a check when vectors (initial, 0 degree orientation, and flipped, 180 degree orientation) representing driveshaft imbalances or midpoints are not uniformly dispersed within a polar coordinate graph but rather tend to fall in an elliptical pattern. This analysis permits the precise identification of assignable causes that impact the measurement and unbalance repeatability of the product.

Figure 14:
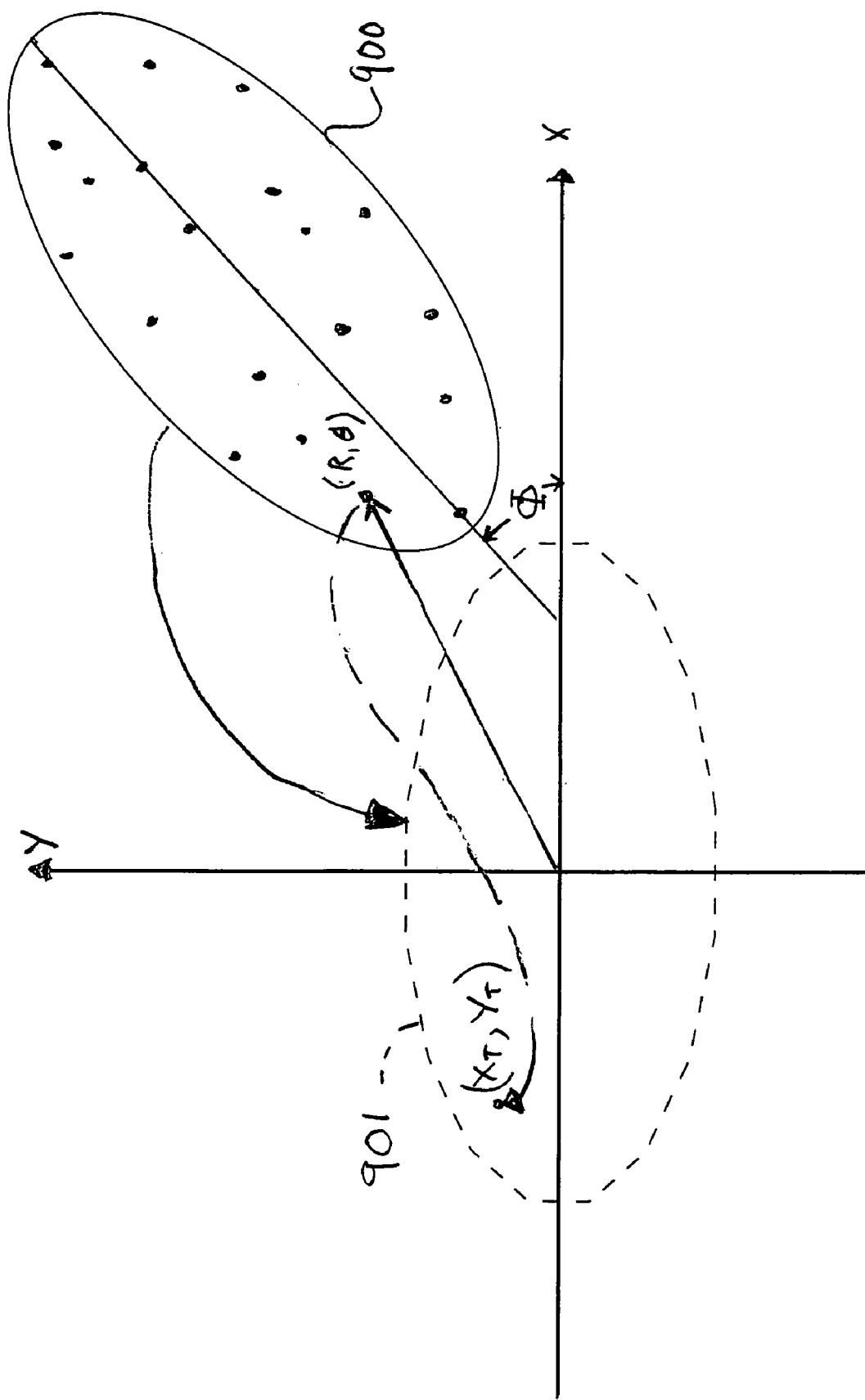
FIG. 14 illustrates how data may be transformed for easier analysis according to the aspect of the invention illustrated in FIG. 13.

A first step 401 of a method for cluster shape analysis according to our invention is to calculate the imbalance components X and Y from the most recent R, the magnitude of the imbalance, and from the angle θ between the vector line representing this imbalance and the positive X axis. This is shown in FIG. 14:

X=R cos(θ); and

Y=R sin(θ).

It should be noted that midpoint data could be analyzed according to this method of cluster shape analysis. If midpoint data is being utilized, substitute X_Midpoint and Y_Midpoint for X and Y, respectively, in the equations given in this first step 401, and in the equations below.

In a second step 402, combine these imbalance components X and Y with the group of the most recent 19 other imbalance components X and Y (or other suitable number of the most recent imbalance components X and Y to achieve the desired confidence level in the analysis). Referring to FIG. 14, these points are shown plotted within an ellipse 900. In order to more easily analyze the shape of the plotted points, that is, to see if they have a uniform circularity indicative of random variation, or an elliptical pattern indicative of non-random distribution, it would be desirable to reposition the data to the area indicated by the ellipse 901. Note that the exemplary data has been chosen to clearly exhibit a non-random, elliptical distribution, but the non-uniformity of the distribution is not always so clear-cut in actual practice. The following steps accomplish this transformation.

In a third step 403, compute the $\bar{X}$ and $\bar{Y}$, the average for the imbalance components X and Y comprising this group of data.

In a fourth step 404, calculate the slope m of the best-fit line through the group of 20 (or other desired number) points:

$$\tan\Phi = m = \sum_i (X_i - \bar{X})(Y_i) \Big/ \sum_i (X_i - \bar{X})^2.$$

In a fifth step 405, calculate from the slope m the angle $\Phi$ between the best-fit line and the positive X axis\:

$$\Phi = \arctan(m).$$

In a sixth step 406, calculate for each of the 20 (or other desired number) of imbalance components X and Y the corresponding coordinates $X_T$ and $Y_T$ which run along the best fit line and perpendicular to it using the following formula:

$$X_T = (X - \bar{X})(\cos\Phi) + (Y - \bar{Y})(\sin\Phi).$$

Figure 16:
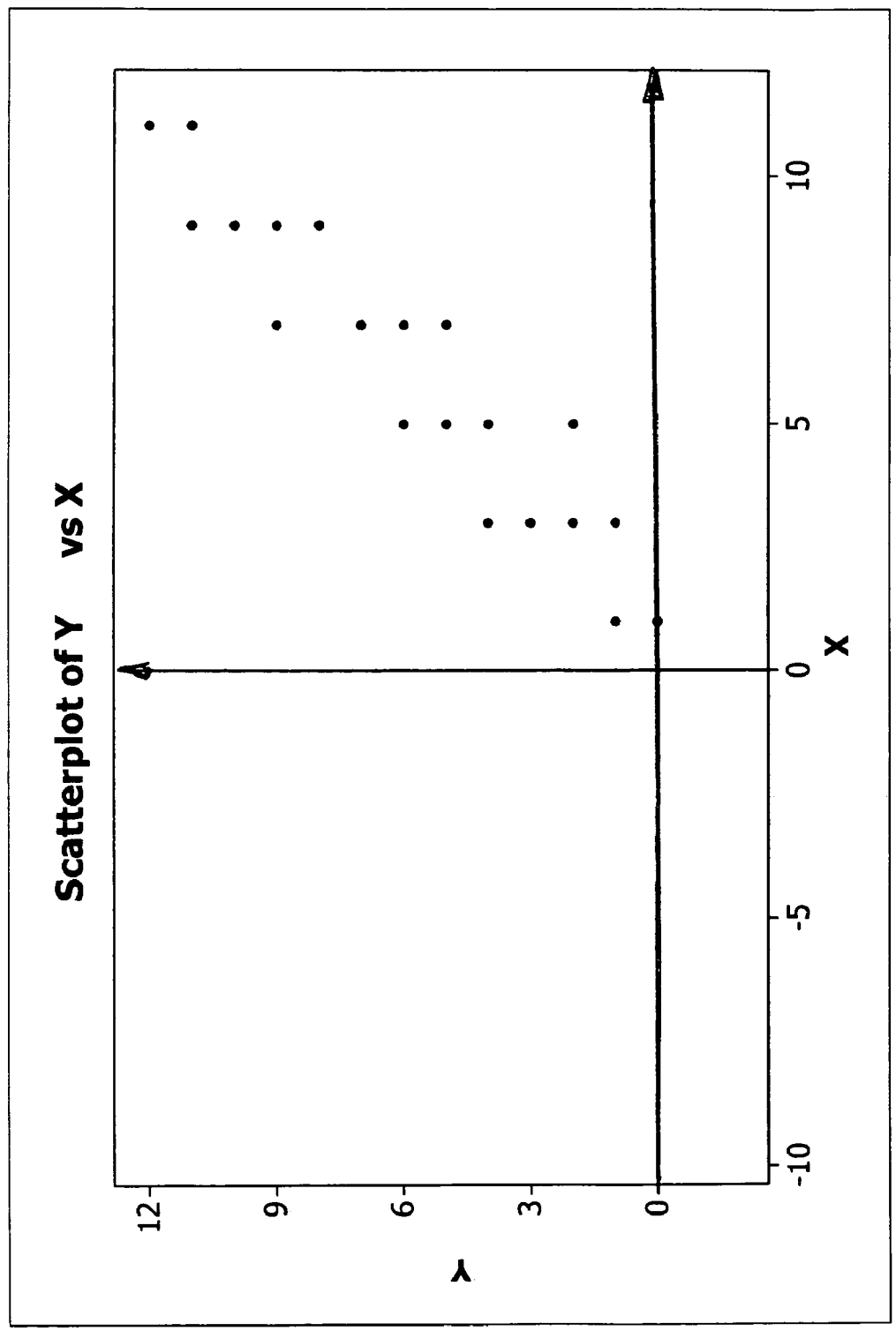
FIGS. 16 and 17 are plots of the exemplary data recorded in the table of FIG. 15, illustrating the transformation of the data for easier analysis according to the aspect of the invention illustrated in FIG. 13.
Figure 17:
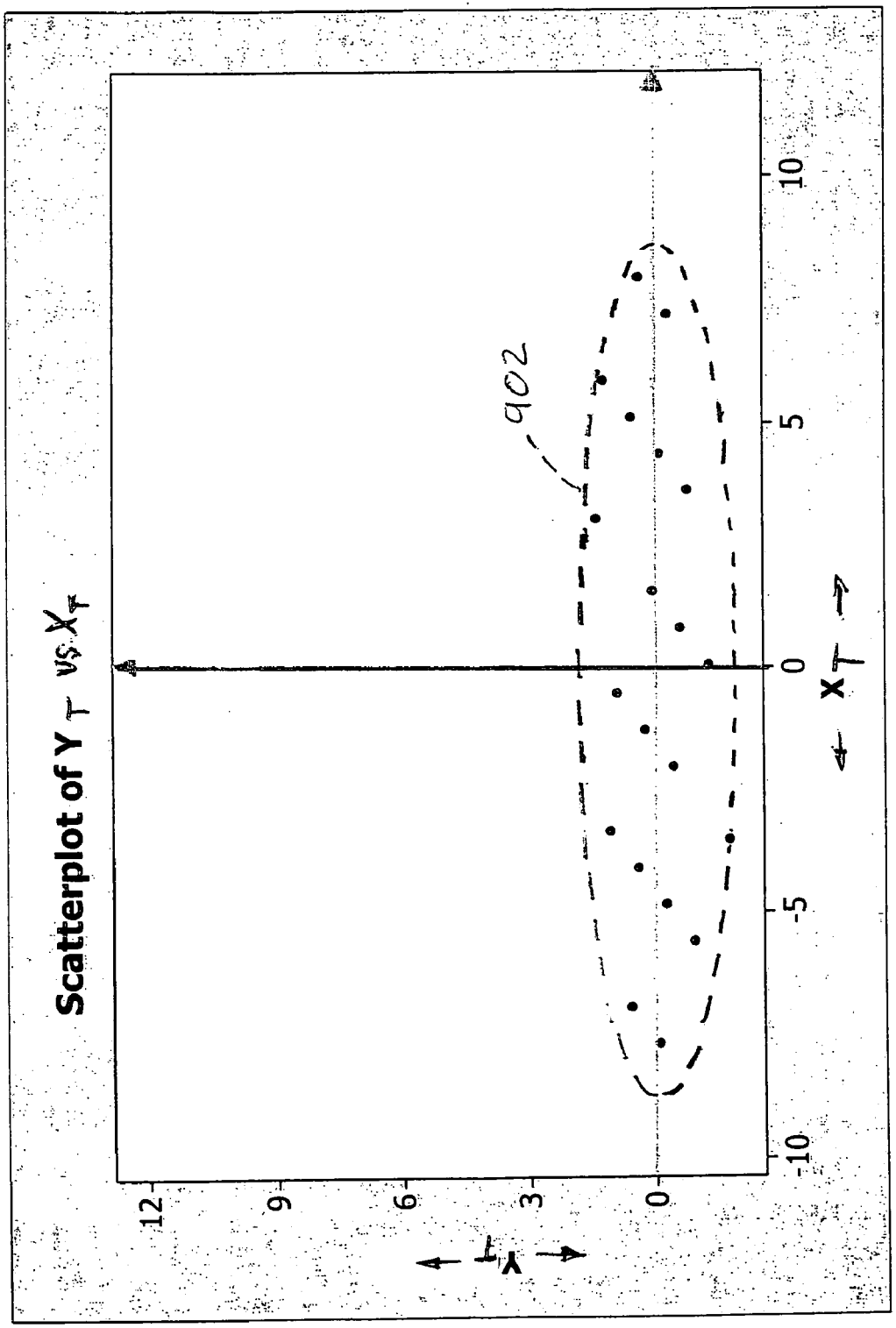

Referring to FIGS. 15 through 17, some fictitious data is presented and graphed. The data presented in a Table illustrated in FIG. 15, and plotted in the graphs of FIGS. 16 and 17 relates to a set of 20 data points. The data points are plotted both on in the original (X,Y) coordinate system (FIG. 16) and transformed $(X_T, Y_T)$ coordinate systems (FIGS. 17 and 19). The transformed points are centered about (0,0) and appear uncorrelated. Visualizing an ellipse 902 encapsulating the data points, one would conclude that the major and minor axes fall along the $X_T$ and $Y_T$ axes respectively. Note: The reverse transformation is as follows:

$$X = \bar{X} + X_T \cos\Phi - Y_T \sin\Phi; \text{ and}$$

$$Y = \bar{Y} + Y_T \cos\Phi + X_T \sin\Phi$$

In a seventh step 407, calculate $F_{CALC}$ (the calculated F statistic) from the formula:

$$F_{CALC} = \sum_i Y_{Ti}^2 \Big/ \sum_i X_{Ti}^2.$$

When $F_{CALC}$ becomes unusually small or large, one can conclude that the data is not circular but elliptical. This suggests that the imbalance component is large in a certain direction but not in the direction perpendicular to it. Upper and lower limits on $F_{CALC}$ are termed Critical F Values, and are denoted $F_{HI\text{-}CRITICAL}$ and $F_{LOW\text{-}CRITICAL}$, respectively. When Critical F Values are exceeded, the data is significantly elliptical, and a review of the equipment would be suggested.

Critical F values should be changeable by part number but for distributions that are approximately normal the following values may be used:

$F_{HI\text{-}CRITICAL} = 3.56 (\alpha = 0.005;$ degrees of freedom, $df = 18, 18)$, and $F_{LOW\text{-}CRITICAL} = 0.28 (\alpha = 0.005; df = 18, 18)$ These values are approximate only since they assume a normal distribution. When using this analysis with a limited data set, such as midpoints, the following table, TABLE 1, can be used for various sample sizes:

TABLE 1

| Number of Midpoints | Degrees of Freedom | Alpha | $F_{HI\text{-}CRITICAL}$ | $F_{LOW\text{-}CRITICAL}$ | Power to Detect 0.05 In-Oz Spread with s = 0.05 In-Oz |
|---|---|---|---|---|---|
| 5 | 3 | 0.01 | 29.46 | 0.034 | 0.05 |
| 6 | 4 | 0.01 | 15.98 | 0.063 | 0.09 |
| 7 | 5 | 0.01 | 10.97 | 0.091 | 0.17 |
| 8 | 6 | 0.01 | 8.47 | 0.118 | 0.27 |
| 9 | 7 | 0.01 | 6.99 | 0.143 | 0.38 |
| 10 | 8 | 0.01 | 6.03 | 0.166 | 0.47 |
| 11 | 9 | 0.01 | 5.35 | 0.187 | 0.57 |
| 12 | 10 | 0.01 | 4.85 | 0.206 | 0.65 |
| 13 | 11 | 0.01 | 4.46 | 0.224 | 0.72 |
| 14 | 12 | 0.01 | 4.16 | 0.241 | 0.78 |
| 15 | 13 | 0.01 | 3.91 | 0.256 | 0.82 |
| 16 | 14 | 0.01 | 3.70 | 0.270 | 0.85 |
| 17 | 15 | 0.01 | 3.52 | 0.284 | 0.88 |
| 18 | 16 | 0.01 | 3.37 | 0.297 | 0.90 |
| 19 | 17 | 0.01 | 3.24 | 0.308 | 0.92 |
| 20 | 18 | 0.01 | 3.13 | 0.320 | 0.95 |

As more data becomes available and the cluster of points grows larger, the critical F values will change with the sample size. Keep in mind that for small sample sizes the power becomes small meaning that there is little ability to detect a significant elliptical pattern should one exist.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for statistically analyzing the operation of a balance system for balancing articles for rotation so as to reduce measurement errors comprising:
   a) collecting raw data during balancing of articles for rotation, including, for multiple articles:
      i) measuring a first imbalance of the articles in a first position; and
      ii) measuring a flip imbalance of the article in a second position, rotationally displaced from the first position;
   b) calculating a midpoint of the first imbalance and the flip imbalance for each of the multiple articles;
   c) statistically analyzing the midpoint data; and
   (d) in response to step (c), performing a corrective action to reduce measurement errors.

2. The method according to claim 1, wherein step c) further comprises the step of determining process control limits so as to discriminate between midpoints that are out of statistical control from midpoints that are within statistical control.

3. The method according to claim 2, wherein step a) further comprises the collection of the first imbalance and flip imbalance data in polar vector form; and
   step b1) further comprises the steps:
      b2) converting the first imbalance and flip imbalance data to Cartesian coordinates by computing the X and Y components of each polar vector; and b2) calculating a mean for each pair of initial and flipped data points by averaging the X and Y components thereof to generate an X_Midpoint and a Y_Midpoint.

4. The method according to claim 3, wherein step c) further comprises the steps:
c1) calculating a sample mean Xbar for the X_Midpoints and a sample mean Ybar for the Y_Midpoints of the data sample;
c2) calculating a sample standard deviation $s_1$ for Xbar over all samples and a sample standard deviation $s_2$ for Ybar over all samples;
c3) estimating a common standard deviation s based upon the sample standard deviations $s_1$ and $s_2$;
c4) calculating at least one of a warning limit $R_{WL}$ and a control limit $R_{CL}$ based upon the common standard deviation s; and
c5) generating at least one of a warning limit circle having a radius equal to the warning limit $R_{WL}$ and a control limit circle having a radius equal to the control limit $R_{CL}$, centered at an origin of a polar coordinate graph.

5. The method according to claim 4, wherein step c) further comprises, following step c5), the steps:
c6) conducting single pass editing of midpoints to eliminate outlying midpoints to leave an adjusted sample of midpoints; and
c7) reconstructing the at least one of a warning limit circle having a radius equal to a reconstructed warning limit $R_{WL}$ based upon the adjusted sample and a control limit circle having a radius equal to a reconstructed control limit $R_{CL}$ based upon the adjusted sample.

6. The method according to claim 1, wherein step c) includes the steps:
c1) calculating a sample mean Xbar for the X_Midpoints and a sample mean Ybar for the Y_Midpoints of the data sample;
c2) calculating a sample standard deviation $s_1$ for Xbar over all samples and a sample standard deviation $s_2$ for Ybar over all samples;
c3) estimating a common standard deviation s based upon the sample standard deviations $s_1$ and $s_2$; and
c4) calculating a Maximum Acceptable Line-Out value based upon the formula MALO=FullBalanceSpec−($R_{BIAS}$+√2*2.45s), where FullBalanceSpec is the total balance tolerance and $R_{BIAS}$ is the magnitude of the bias.

7. The method according to claim 1, wherein step a) includes, before step a) i), the steps:
A) measuring and recording an amount of initial imbalance (before any correction weights are applied) that is present in the articles; and
B) if the initial imbalance exceeds a pre-determined limit, taking corrective action to bring the articles to within the pre-determined limit of imbalance, whereby the articles are then ready for measurement of the first imbalance thereof in step a) i).

8. The method according to claim 1, wherein step c) further comprises the step of analyzing patterns that are created by the distribution of the midpoints on a polar coordinate graph so as to provide an understanding of the data by determining the slope of a least squares regression line through the original plotted location, and transforming the plot of the data so that the data is centered at the origin of an Cartesian coordinate graph with a slope equal to zero, whereby the X and Y components of the midpoints may be easily analyzed to determine if the plot exhibits a significant departure from circularity.

9. The method according to claim 1, wherein step c) further comprises the step of performing measurement error analysis so as to measure an amount of error that is observed by the balancing system.

10. The method according to claim 9, wherein the balancing system includes a balancing machine and a fixture for operatively connecting the articles to the balancing machine, a setup being defined as an instance of operation of the balancing system from the time of an instance of installing and balancing a particular fixture on a particular balancing machine, and calibrating the machine, until the fixture is removed or the machine is re-calibrated, step c) further comprising estimating the variance of midpoint data collected during a setup, $V_M$, according to the following formulas:

$$V_{MX} = \left\{\sum_s \left[\sum_m (X_{sm} - \overline{X}_s)^2 / (M_s - 1)\right]\right\} / S,$$

$$V_{MY} = \left\{\sum_s \left[\sum_m (Y_{sm} - \overline{Y}_s)^2 / (M_s - 1)\right]\right\} / S, \text{ and}$$

$$V_M = (V_{MX} + V_{MY})/2$$

where
S is the number of setups,
$M_S$ is the number of midpoints in the s-th setup;
m is the index for midpoint;
$V_{MX}$ is the estimate of the variance of the X components of midpoint data collected within the s-th setup,
$V_{MY}$ is the estimate of the variance of the Y components of midpoint data collected within the s-th setup,
$X_{sm}$ is the m-th X_Midpoint within the s-th setup,
X_Midpoint is the X component of a midpoint,
$\overline{X}_s$ represents the average X_Midpoint for the s-th setup,
$Y_{sm}$ is the m-th Y_Midpoint within the s-th setup, Y_Midpoint is the Y component of a midpoint, and $\overline{Y}_s$ represents the average Y_Midpoint for the s-th setup.

11. The method according to claim 9, wherein the balancing system includes a balancing machine and a fixture for operatively connecting the articles to the balancing machine, a setup being defined as an instance of operation of the balancing system from the time of an instance of installing and balancing a particular fixture on a particular balancing machine and calibrating the machine, until the fixture is removed or the machine is re-calibrated, step c) further comprising estimating the common between-setup variance of midpoint data, $V_s$, according to the following formulas:

$$M_S Bar = \left(\sum_S M_S - \sum_S M_S^2 \bigg/ \sum_S M_S\right) \bigg/ (S-1),$$

$$V_{SX} = \left[\sum_S [(M_S)(\overline{X_S} - \overline{X})^2]\right] \bigg/ \left(\sum_S M_S - M_S Bar\right),$$

$$V_{SY} = \left[\sum_S [(M_S)(\overline{Y_S} - \overline{Y})^2]\right] \bigg/ \left(\sum_S M_S - M_S Bar\right), \text{ and}$$

$$V_S = (V_{SX} + V_{SY})/2$$

where $M_s$Bar is the average number of midpoints in a setup, $\overline{X}_s$ is the average X_Midpoint for the s-th setup, X_Midpoint is the X component of a midpoint, $\overline{Y}_s$ is the average Y Midpoint for the s-th setup, Y_Midpoint is the Y component of a midpoint, $\overline{X}$ is the average X_Midpoint for all setups, $\overline{Y}$ is the average Y_Midpoint for all setups, $V_{sx}$ is the estimate of the common between-setup variance of the X components of midpoint data, $V_{SY}$ is the estimate of the common between-setup variance of the Y components of midpoint data, $M_s$ is the number of midpoints in the s-th setup, and S is the number of setups.

12. The method according to claim 10, step c) further comprising calculating the components of variation due to Repeatability and Reproducibility, R&R, according to the following:

$$M_S Bar = \left(\sum_S M_S - \sum_S M_S^2 / \sum_S M_S\right) / (S-1),$$

$$V_{SX} = \left[\sum_S [(M_S)(\overline{X_S} - \overline{X})^2] / \left(\sum_S M_S - M_S Bar\right)\right],$$

$$V_{SY} = \left[\sum_S [(M_S)(\overline{Y_S} - \overline{Y})^2] / \left(\sum_S M_S - M_S Bar\right)\right],$$

$$V_S = (V_{SX} + V_{SY})/2,$$

$$\sigma_M^2 = V_M,$$

$$\sigma_S^2 = V_S - \sigma_M^2 / M_S Bar,$$

$$\sigma_M = \sqrt{\sigma_M^2}$$

$$\sigma_S = \sqrt{\sigma_S^2}$$

$$EV = 5.15\sigma_M,$$

$$AV = 5.15\sigma_S, \text{ and}$$

$$R\&R = \sqrt{EV^2 + AV^2}$$

where $M_s$Bar is the average number of midpoints, $\overline{X}$ is the average X_Midpoint for all setups, $\overline{Y}$ is the average Y Midpoint for all setups, $V_{sx}$ is the estimate of the common between-setup variance of the X components of midpoint data, $V_{sy}$ is the estimate of the common between-setup variance of the Y components of midpoint data, $V_s$ is the common between-setup variance of midpoint data, $\sigma_M^2$ is the midpoint to midpoint variance, $\sigma_M$ is the standard deviation of the midpoints, $\sigma_s^2$ is the setup to setup variance, $\sigma_s$ is the standard deviation of the setups, EV is Equipment Variation, and AV is Setup (Appraiser) Variation.

13. The method according to claim 12, wherein R&R is related to Percent of Tolerance according to the formula %R&R32 100 (R&R/Total Tolerance), where Total Tolerance =(maximum allowable imbalance)× 2/√2.

14. The method according to claim 12, further including calculating of the portion of the maximum allowable imbalance that is taken up by Bias expressed as a percentage, Bias Percent of Tolerance, utilizing the following formulas:

$$N = \sum_S M_S,$$

$$X_{Bias} = \sum_{i=1}^{N} \text{X\_Midpoint}/N,$$

$$Y_{Bias} = \sum_{i=1}^{N} Y - \text{Midpoint}/N, \text{ and}$$

$$R_{Bias} = \sqrt{(X_{Bias}^2 + Y_{Bias}^2)},$$

%BIAS = 100($R_{BIAS}$)/(Total Tolerance)

where

N is the total number of midpoints, $X_{BIAS}$ is the X component of Bias, $Y_{BIAS}$ is the Y component of Bias, and Total Tolerance=(maximum allowable imbalance)×2/√2.

* * * * *

UNITED STATES PATENT AND TRADEMARK OFFICE
CERTIFICATE OF CORRECTION

| | |
|---|---|
| PATENT NO. | : 7,219,036 B2 |
| APPLICATION NO. | : 11/365956 |
| DATED | : May 15, 2007 |
| INVENTOR(S) | : Mark E. Abbotoy and Vincent J. Morgillo |

It is certified that error appears in the above-identified patent and that said Letters Patent is hereby corrected as shown below:

Claim 3, Line 64 After "step b" Remove "1"

Claim 3, Line 65 After "b" Replace "2" with --1--

Claim 13 Line 19 After "%R&R" Remove "32"

Signed and Sealed this

Third Day of July, 2007

JON W. DUDAS
*Director of the United States Patent and Trademark Office*